(12) United States Patent
Chauhan et al.

(10) Patent No.: US 11,645,078 B2
(45) Date of Patent: May 9, 2023

(54) DETECTING A DYNAMIC CONTROL FLOW RE-CONVERGENCE POINT FOR CONDITIONAL BRANCHES IN HARDWARE

(71) Applicant: Intel Corporation, Santa Clara, CA (US)

(72) Inventors: Adarsh Chauhan, Bengaluru (IN); Franck Sala, Haifa (IL); Jayesh Gaur, Bangalore (IN); Zeev Sperber, Zichron Yackov (IL); Lihu Rappoport, Haifa (IL); Adi Yoaz, Hof HaCarmel (IL); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,349

(22) Filed: Dec. 28, 2019

(65) Prior Publication Data

US 2021/0019149 A1 Jan. 21, 2021

Related U.S. Application Data

(60) Provisional application No. 62/876,463, filed on Jul. 19, 2019.

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/30145* (2013.01)

(58) Field of Classification Search
CPC .................. G06F 9/30058; G06F 9/3806
See application file for complete search history.

(56) References Cited

U.S. PATENT DOCUMENTS

| | | | |
|---|---|---|---|
| 2002/0174319 A1* | 11/2002 | Rivers ................ | G06F 9/30192 712/200 |
| 2009/0172371 A1* | 7/2009 | Joao ...................... | G06F 9/3844 712/240 |
| 2020/0004542 A1 | 1/2020 | Chauhan et al. | |
| 2020/0159538 A1* | 5/2020 | Gorti .................... | G06F 9/3861 |

FOREIGN PATENT DOCUMENTS

EP 2631785 A1 8/2013

OTHER PUBLICATIONS

Extended European Search Report, EP. App. No. 20163796.4, dated Nov. 19, 2020, 11 pages.

(Continued)

*Primary Examiner* — Zachary K Huson
(74) *Attorney, Agent, or Firm* — Nicholson De Vos Webster & Elliott LLP

(57) ABSTRACT

Systems, methods, and apparatuses relating to hardware for auto-predication of critical branches. In one embodiment, a processor core includes a decoder to decode instructions into decoded instructions, an execution unit to execute the decoded instructions, a branch predictor circuit to predict a future outcome of a branch instruction, and a branch predication manager circuit to disable use of the predicted future outcome for a conditional critical branch comprising the branch instruction.

24 Claims, 23 Drawing Sheets

(56) References Cited

OTHER PUBLICATIONS

Joao et al., "Improving the Performance of Object-Oriented Languages with Dynamic Predication of Indirect Jumps", ASPLOS'08, ACM, Mar. 1-5, 2008, pp. 80-90.

Ahuja et al., "Multipath execution: Opportunities and limits", in Proceedings of the 12th International Conference on Supercomputing, ser. ICS '98, ACM, 1998, pp. 101-108.

Allen et al., "Conversion of control dependence to data dependence", in Proceedings of the 10th ACM SIGACT-SIGPLAN Symposium on Principles of Programming Languages, ser. POPL '83, ACM, 1983, pp. 177-189.

Arm, "Arm® instruction set", Available Online at <https://static.docs.arm.eom/100076/0100/arm_instruction_set_reference_guide_100076_0100_00_en.pdf>, Reference Guide, Version 1.0, Oct. 25, 2018, 1558 pages.

August et al., "A framework for balancing control flow and predication", in Proceedings of 30th Annual International Symposium on Microarchitecture, Dec. 1997, 12 pages.

BAPCO®, "SYSmark® 2018", Available Online at <http://bapco.com/wp-content/uploads/2018/08/SYSmark_2018_White_Paper_1.0.pdf>, White Paper, Revision 1.0, Aug. 17, 2018, pp. 1-30.

BAPCO®, "Tabletmark® 2017", Available Online at <https://bapco.com/wp-content/uploads/2017/02/TabletMark-2017-WhitePaper-1.0.pdf>, white paper, Revision 1.0, Feb. 2017, pp. 1-35.

Bienia et al., "The parsec benchmark suite: Characterization and architectural implications", in 2008 International Conference on Parallel Architectures and Compilation Techniques (PACT), Oct. 2008, pp. 1-10.

Chang et al., "Using predicated execution to improve the performance of a dynamically scheduled machine with speculative execution", in Proceedings of the IFIP WG10.3 Working Conference on Parallel Architectures and Compilation Techniques, ser. PACT '95, IFIP Working Group on Algol, 1995, 11 pages.

Chaudhry et al., "High-performance throughput computing", IEEE Micro, vol. 25, No. 3, 2005, pp. 32-45.

Collins et al., "Control flow optimization via dynamic reconvergence prediction", in 37th International Symposium on Microarchitecture (MICRO-37'04), Dec. 2004, pp. 129-140.

Doweck et al., "Inside 6th-generation intel core: New microarchitecture code-named skylake", IEEE Micro, vol. 37, No. 2, 2017, pp. 52-62.

Farrens et al., "Restricted dual path execution", Computer Science Department, Technical Report No. CSE-97-18, Nov. 24, 1997, 16 pages.

Fields et al., "Focusing processor policies via critical-path prediction", in Proceedings 28th Annual International Symposium on Computer Architecture, Jun. 2001, pp. 74-85.

Fog, Agner, "The microarchitecture of intel, amd and via cpus: an optimization guide for assembly programmers and compiler makers", Technical University of Denmark, Last Updated on Sep. 15, 2018, pp. 1-238.

Future Corporation, "3dmark 11—the gamer's benchmark for directx 11", Available Online at <http://s3.amazonaws.com/download-aws.futuremark.com/3DMark_11_Whitepaper.pdf>, Whitepaper, Version: 1.0, Dec. 2010, pp. 1-11.

Gandhi et al., "Reducing branch misprediction penalty via selective branch recovery", in Proceedings of the 10th International Symposium on High Performance Computer Architecture, ser. HPCA '04, IEEE Computer Society, 2004, 254 pages.

Grunwald et al., "Confidence estimation for speculation control", in Proceedings of the 25th Annual International Symposium on Computer Architecture, (Cat. No 98CB36235), Jul. 1998, 11 pages.

Heil et al., "Selective dual path execution", Technical Report, Nov. 8, 1996, pp. 1-29.

Henning, John L., "Spec cpu2006 benchmark descriptions", ACM SIGARCH Computer Architecture News, vol. 34, No. 4, Sep. 2006, 17 pages.

Intel®, "Intel 64 and ia-32 architectures optimization reference manual", Available Online at <https://software.intel.com/sites/default/files/managed/9e/bc/64-ia-32-architectures-optimization-manual.pdf>, Order No. 248966-041, Apr. 2019, 825 pages.

Jacobsen et al., "Assigning confidence to conditional branch predictions", in Proceedings of the 29th Annual ACM/IEEE International Symposium on Microarchitecture, ser. MICRO 29, IEEE Computer Society, 1996, 12 pages.

Jimenez et al., "Dynamic branch prediction with perceptrons", in Proceedings HPCA Seventh International Symposium on High-Performance Computer Architecture, Jan. 2001, pp. 197-206.

Kim et al., "Diverge-merge processor (dmp): Dynamic predicated execution of complex control-flow graphs based on frequently executed paths", in 2006 39th Annual IEEE/ACM International Symposium on Microarchitecture (MICRO'06), Dec. 2006, 12 pages.

Kim et al., "Wish branches: Combining conditional branching and predication for adaptive predicated execution", in Proceedings of the 38th Annual IEEE/ACM International Symposium on Microarchitecture, ser. MICRO 38, IEEE Computer Society, 2005, pp. 43-54.

Klauser et al., "Dynamic hammock predication for non-predicated instruction set architectures", in Proceedings of the 1998 International Conference on Parallel Architectures and Compilation Techniques, ser. PACT '98, IEEE Computer Society, 1998, 8 pages.

Klauser et al., "Instruction fetch mechanisms for multipath execution processors", in MICRO-32, Proceedings of the 32nd Annual ACM/IEEE International Symposium on Microarchitecture, Nov. 1999, 10 pages.

Klauser et al., "Selective eager execution on the polypath architecture", in Proceedings of the 25th Annual International Symposium on Computer Architecture, (Cat. No.98CB36235), Jul. 1998, 10 pages.

Lam et al., "Limits of control flow on parallelism", in Proceedings of the 19th Annual International Symposium on Computer Architecture, ser. ISCA'92, Acm, 1992, 12 pages.

Limaye et al., "A workload characterization of the spec cpu2017 benchmark suite", in 2018 IEEE International Symposium on Performance Analysis of Systems and Software (ISPASS), Apr. 2018, 10 pages.

Mahlke et al., "Effective compiler support for predicated execution using the hyperblock", in Proceedings of the 25th Annual International Symposium on Microarchitecture, ser. MICRO 25, IEEE Computer Society Press, 1992, pp. 45-54.

Ozturk et al., "An analysis of hard to predict branches", in 2010 IEEE International Symposium on Performance Analysis of Systems Software (ISPASS), Mar. 2010, pp. 213-222.

Plimpton, Steve, "A Quick Tour of Lammps", Sandia National Labs, Available Online at <https://lammps.sandia.gov/workshops/Aug15/PDF/tutorial_Plimpton.pdf>, 4th LAMMPS Workshop, Aug. 2015, 81 pages.

Poovey et al., "A benchmark characterization of the eembc benchmark suite", IEEE Micro, vol. 29, No. 5, Sep. 2009, pp. 18-29.

Premillieu et al., "Syrant: Symmetric resource allocation on not-taken and taken paths", ACM Trans. Archit. Code Optim., vol. 8, No. 4, Jan. 2012, pp. 43:1-43:20.

Primate Labs, "Geekbench 4 cpu workloads", Available Online at <https://www.geekbench.com/doc/geekbench4-cpu-workloads.pdf>, Dec. 2018, pp. 1-15.

Seznec et al., "The inner most loop iteration counter: a new dimension in branch history", in Proceedings of the 48th Annual IEEE/ACM International Symposium on Microarchitecture (MICRO), Dec. 2015, pp. 347-357.

Seznec, Andre, "A 64-kbytes ittage indirect branch predictor", in Third Championship Branch Prediction (JWAC-2), 2011.

Seznec, Andre, "A new case for the tage branch predictor", in Proceedings of the 44th Annual IEEE/ACM International Symposium on Microarchitecture, ser. MICRO-44, ACM, 2011, 11 pages.

Sheikh et al., "Control-flow decoupling", in Proceedings of the 45th Annual IEEE/ACM International Symposium on Microarchitecture, Dec. 2012, pp. 329-340.

(56) References Cited

OTHER PUBLICATIONS

Sprangle et al., "Increasing processor performance by implementing deeper pipelines", in Proceedings 29th Annual International Symposium on Computer Architecture, May 2002, pp. 25-34.
Communication pursuant to Article 94(3) EPC, EP App. No. 20163796.4, dated Aug. 16, 2021, 7 pages.
Office Action, EP App. No. 20163796.4, dated May 24, 2022, 6 pages.

* cited by examiner

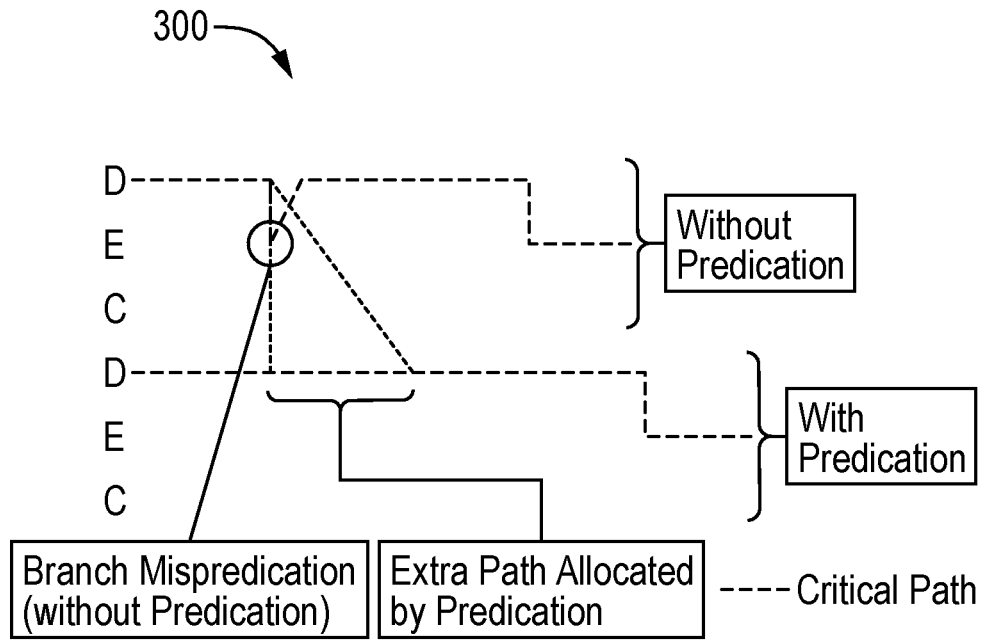

FIG. 3A

```
0xa    cmpq %rax, 0x1
0xb    jge 0xf    #Branch-B1
0xc    ld 0xf (%rsp), %rbx
0xd    and1 %rbx, %rcx
0xe    xorl %rax, %rax
0xf    inc %rcx
0xg    st %rcx, (%rbx)
0xh    cmpq %rax, 0x0
0xi    jg 0x1    #Branch-B2
0xj    ...
```

Branch B1 at 0xb is predicate-able and is perfectly correlated with Branch B2 at 0xi. If B1 is Taken, then B2 is Not-Taken; if B1 us Not-Taken, then B2 is Taken.

FIG. 3B

```
0xa    and %rax, %rbx
0xb    jz 0xf    #Branch-B1
0xc    movl %rax, %rbx
0xd    add %rbx, 0x1
0xe    jmp 0xh
0xf    movl %rbx, %rax
0xg    add %rbx, 0xfff...f
0xh    inc %rcx
0xi    ld (%rbx), %rdx #LL-Load
0xj    ...
```

Branch at 0xb is an H2P which is predicate-able. Load at 0xi is a Long-Latency-Load which is dependent on the live-outs produced from the branch body.

FIG. 3C

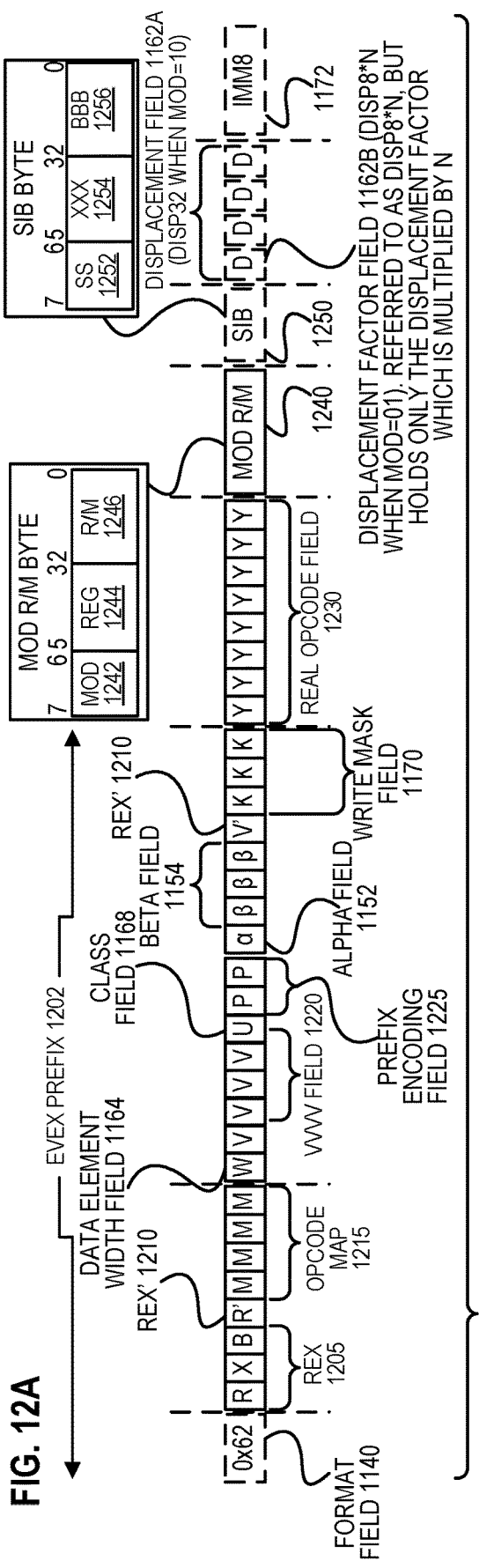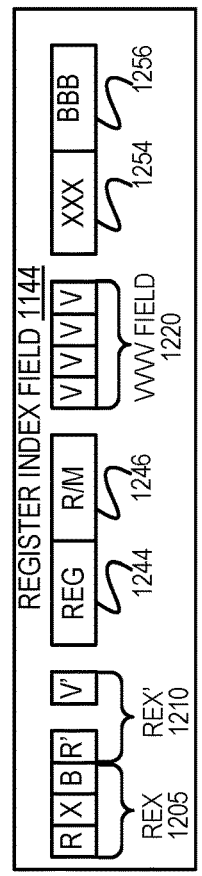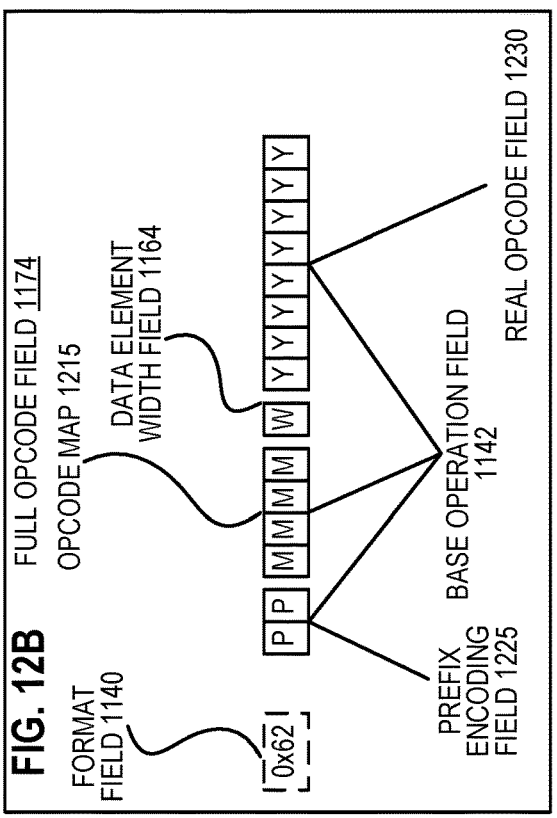

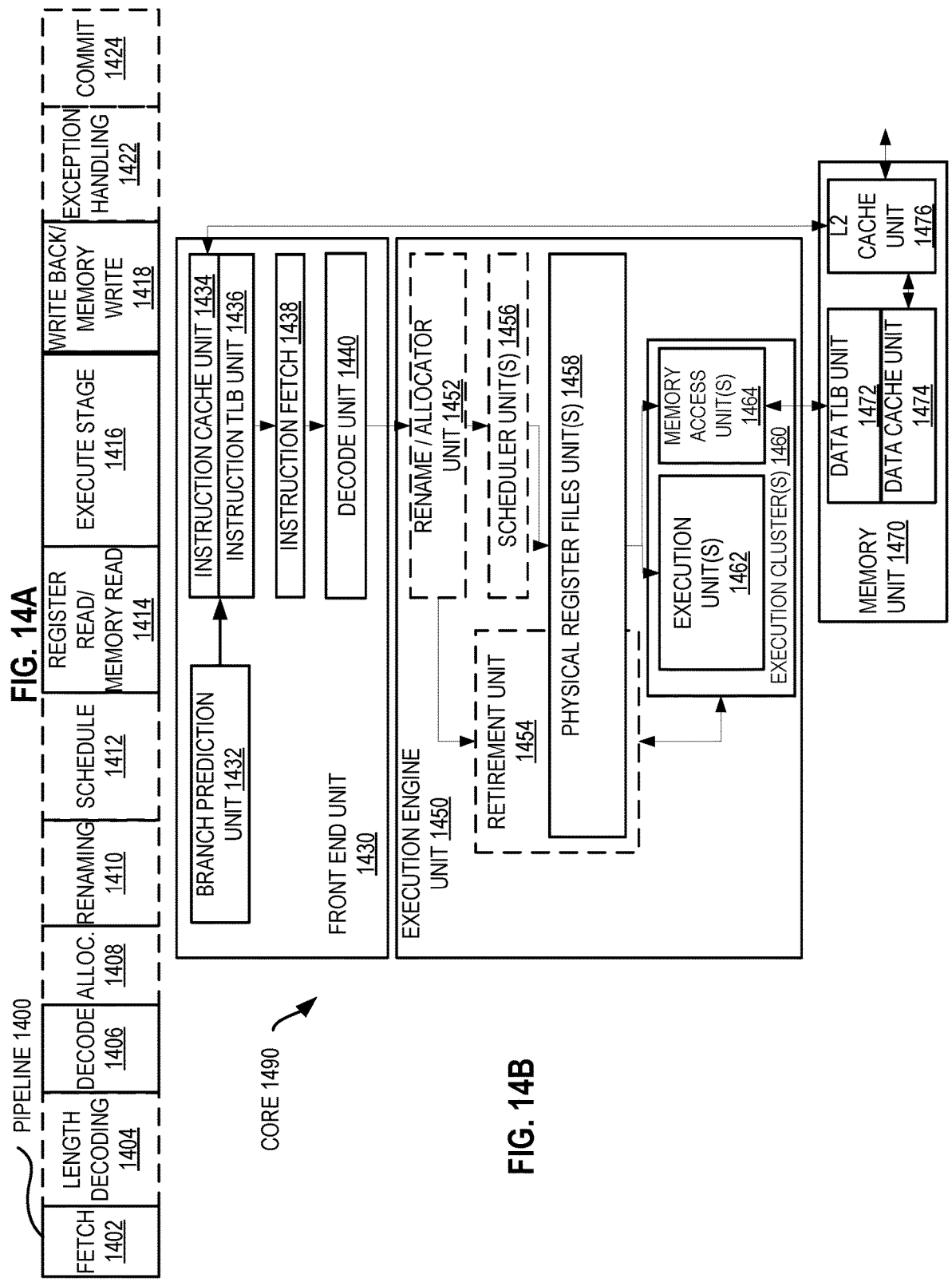

DETECTING A DYNAMIC CONTROL FLOW RE-CONVERGENCE POINT FOR CONDITIONAL BRANCHES IN HARDWARE

CROSS-REFERENCE TO RELATED APPLICATIONS

The present patent application claims the benefit of U.S. Provisional Patent Application No. 62/876,463, filed Jul. 19, 2019, and titled: "Hardware for Auto-Predication of Critical Branches", which is incorporated herein by reference in its entirety.

TECHNICAL FIELD

The disclosure relates generally to electronics, and, more specifically, an embodiment of the disclosure relates to hardware for detecting a dynamic control flow re-convergence point for conditional branches.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

Various embodiments in accordance with the present disclosure will be described with reference to the drawings, in which:

FIG. 3A demonstrates change in critical path due to extra-allocation by predication according to embodiments of the disclosure.

FIG. 3B illustrates an example of a perfectly correlating branch following a predicated branch according to embodiments of the disclosure.

FIG. 3C illustrates an example where a critical long-latency load is dependent on a predicated branch outcome according to embodiments of the disclosure.

FIG. 12A is a block diagram illustrating fields for the generic vector friendly instruction formats in FIGS. 11A and 11B according to embodiments of the disclosure.

FIG. 12B is a block diagram illustrating the fields of the specific vector friendly instruction format in FIG. 12A that make up a full opcode field according to one embodiment of the disclosure.

FIG. 12C is a block diagram illustrating the fields of the specific vector friendly instruction format in FIG. 12A that make up a register index field according to one embodiment of the disclosure.

FIG. 14A is a block diagram illustrating both an exemplary in-order pipeline and an exemplary register renaming, out-of-order issue/execution pipeline according to embodiments of the disclosure.

FIG. 14B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
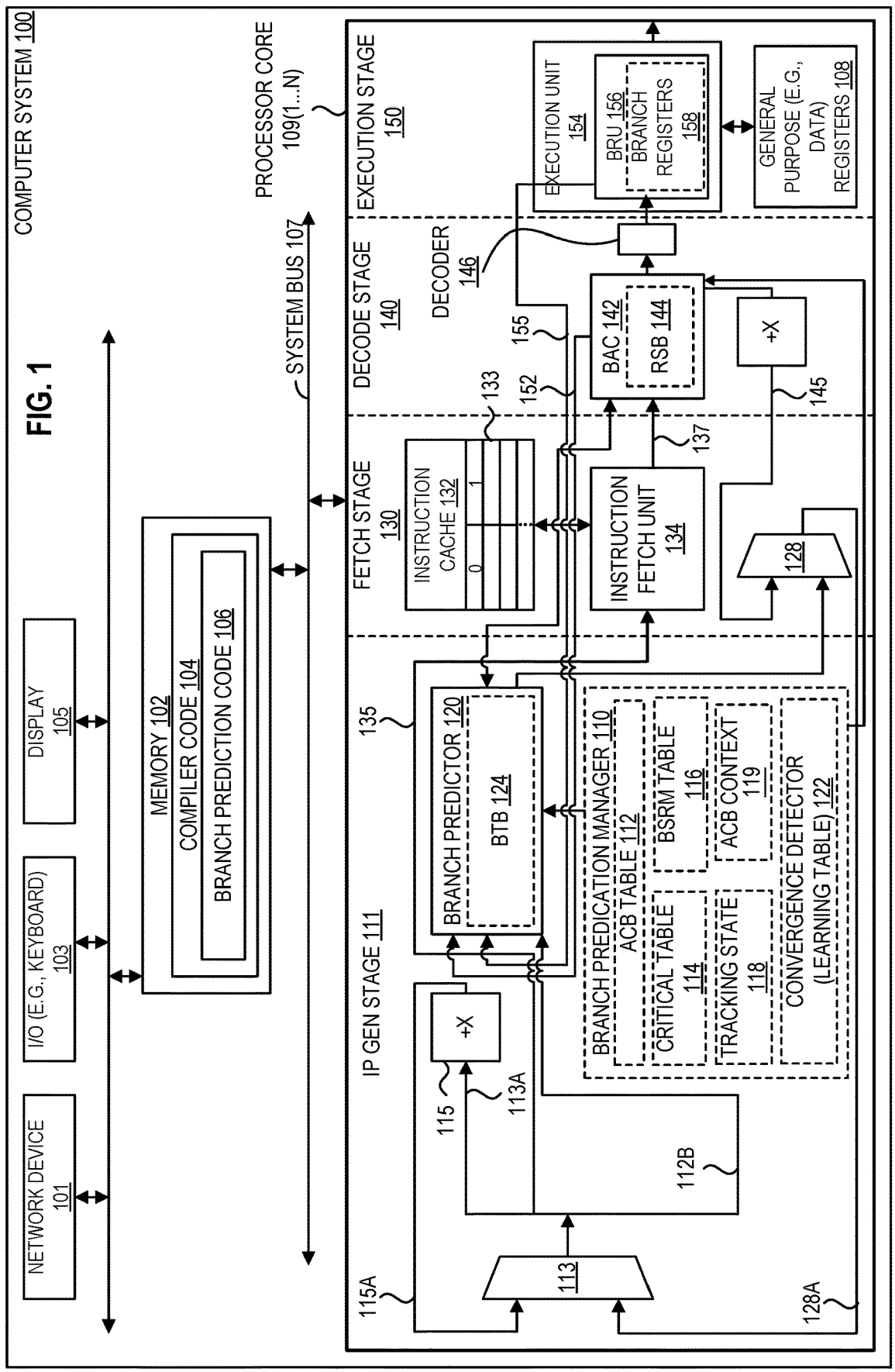
FIG. 1 illustrates a computer system including a processor core according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. The software may include one or more branches (e.g., branch instructions) that cause the execution of a different instructions sequence than in program order. A branch instruction may be an unconditional branch, which always results in branching, or a conditional branch, which may or may not cause branching depending on some condition(s). Certain processors are pipelined to allow more instructions to be completed faster. This generally means that instructions do not wait for the previous ones to complete before their execution begins. A problem with this approach arises, however, due to conditional branches. Particularly, when the processor encounters a conditional branch and the result for the condition has not yet been calculated, it does not know whether to take the branch or not. Branch prediction is what certain processors use to decide whether to take a conditional branch or not. Getting this information as accurately as possible is important, as an incorrect prediction (e.g., misprediction) will cause certain processors to throw out all the instructions that did not need to be executed and start over with the correct set of instructions, e.g., with this process being particularly expensive with deeply pipelined processors.

In one embodiment, a branch predictor of a processors aggressively speculates and gain significant performance, e.g., with an increasing out-of-order depth and width. Unfortunately, there are branches that are still hard-to-predict and mis-speculation on these branches is severely limiting the performance scalability of future processors. One potential solution to mitigate this problem is to predicate branches by substituting control dependencies with data dependencies. In certain embodiments, this technique is unfortunately very costly for performance as it inhibits instruction level parallelism. To overcome this limitation, one proposal is to selectively apply predication at run-time on hard to predict branches that have low confidence of branch prediction. However, that proposal does not fully comprehend the delicate trade-offs involved in suppressing speculation and hence can suffer from performance degradation on certain workloads. Additionally, that proposal needs significant changes not just to the hardware but also to the compiler and the instruction set architecture, rendering the implementation complex and challenging in certain embodiments.

Certain embodiments herein use program criticality to build a fundamental understanding of the trade-offs between prediction and predication. Certain embodiments herein are directed to a hardware-only solution that intelligently disables speculation only on branches that are critical for performance, e.g., an embodiment of which may be referred to as Auto-Predication of Critical Branches (ACB). Unlike existing approaches, ACB uses a sophisticated performance monitoring mechanism to gauge the effectiveness of limiting speculation, and hence does not suffer from performance inversions. In one embodiment, a branch predication manager (e.g., an ACB circuit) adds about 384 bytes of additional hardware and no software support, e.g., while reducing pipeline flushes because of mis-speculations, thus making it a unique feature that helps both power and performance.

FIG. 1 illustrates a computer system 100 including a processor core 109 according to embodiments of the disclosure. Processor core 109 may include a branch predication manager 110, e.g., including ACB functionality as discussed herein. Depicted computer system 100 includes a branch predictor 120 and a branch address calculator 142 (BAC) in a pipelined processor core 109(1)-109(N) according to embodiments of the disclosure. Referring to FIG. 1, a pipelined processor core (e.g., 109(1)) includes an instruction pointer generation (IP Gen) stage 111, a fetch stage 130, a decode stage 140, and an execution stage 150. In certain embodiments, a retirement stage (e.g., including a re-order buffer (ROB)) follows execution stage 150. In one embodiment, computer system 100 (e.g., processor thereof) includes multiple cores 109(1-N), where N is any positive integer. In another embodiment, computer system 100 (e.g., processor thereof) includes a single core. In certain embodiments, each processor core 109(1-N) instance supports multithreading (e.g., executing two or more parallel sets of operations or threads on a first and second logical core), and may do so in a variety of ways including time sliced multithreading, simultaneous multithreading (e.g., where a single physical core provides a logical core for each of the threads that physical core is simultaneously multithreading), or a combination thereof (e.g., time sliced fetching and decoding and simultaneous multithreading thereafter). In the depicted embodiment, each single processor core 109(1) to 109(N) includes an instance of branch predictor 120. Branch predictor 120 may include a branch target buffer (BTB) 124.

In certain embodiments, branch target buffer 124 stores (e.g., in a branch predictor array) the predicted target instruction corresponding to each of a plurality of branch instructions (e.g., branch instructions of a section of code that has been executed multiple times). In the depicted embodiment, a branch address calculator (BAC) 142 is included which accesses (e.g., includes) a return stack buffer 144 (RSB). In certain embodiments, return stack buffer 144 is to store (e.g., in a stack data structure of last data in is the first data out (LIFO)) the return addresses of any CALL instructions (e.g., that push their return address on the stack).

Branch address calculator (BAC) 142 is used to calculate addresses for certain types of branch instructions and/or to verify branch predictions made by a branch predictor (e.g., BTB). In certain embodiments, the branch address calculator performs branch target and/or next sequential linear address computations. In certain embodiments, the branch address calculator performs static predictions on branches based on the address calculations.

In certain embodiments, the branch address calculator 142 contains a return stack buffer 144 to keep track of the return addresses of the CALL instructions. In one embodiment, the branch address calculator attempts to correct any improper prediction made by the branch predictor 120 to reduce branch misprediction penalties. As one example, the branch address calculator verifies branch prediction for those branches whose target can be determined solely from the branch instruction and instruction pointer.

In certain embodiments, the branch address calculator 142 maintains the return stack buffer 144 utilized as a branch prediction mechanism for determining the target address of return instructions, e.g., where the return stack buffer operates by monitoring all "call subroutine" and "return from subroutine" branch instructions. In one embodiment, when the branch address calculator detects a "call subroutine" branch instruction, the branch address calculator pushes the address of the next instruction onto the return stack buffer, e.g., with a top of stack pointer marking the top of the return stack buffer. By pushing the address immediately following each "call subroutine" instruction onto the return stack buffer, the return stack buffer contains a stack of return addresses in this embodiment. When the branch address calculator later detects a "return from subroutine" branch instruction, the branch address calculator pops the top return address off of the return stack buffer, e.g., to verify the return address predicted by the branch predictor 120. In one embodiment, for a direct branch type, the branch address calculator is to (e.g., always) predict taken for a conditional branch, for example, and if the branch predictor does not predict taken for the direct branch, the branch address calculator overrides the branch predictor's missed prediction or improper prediction.

The core 109 in FIG. 1 includes circuitry to validate branch predictions made by the branch predictor 120. Each branch predictor 120 entry (e.g., in BTB 124) may further includes a valid field and a bundle address (BA) field which are used to increase the accuracy and validate branch predictions performed by the branch predictor 120, as is discussed in more detail below. In one embodiment, the valid field and the BA field each consist of one bit fields. In other embodiments, however, the size of the valid and BA fields may vary. In one embodiment, a fetched instruction is sent (e.g., by BAC 142 from line 137) to the decoder 146 to be decoded, and the decoded instruction is sent to the execution unit 154 to be executed.

Depicted computer system 100 includes a network device 101, input/output (I/O) circuit 103 (e.g., keyboard), display 105, and a system bus (e.g., interconnect) 107.

In one embodiment, the branch instructions stored in the branch predictor 120 are pre-selected by a compiler as branch instructions that will be taken. In certain embodiments, the compiler code 104, as shown stored in the memory 102 of FIG. 1, includes a sequence of code that, when executed, translates source code of a program written in a high-level language into executable machine code. In one embodiment, the compiler code 104 further includes additional branch predictor code 106 that predicts a target instruction for branch instructions (for example, branch instructions that are likely to be taken (e.g., pre-selected branch instructions)). The branch predictor 120 (e.g., BTB 124 thereof) is thereafter updated with target instruction for a branch instruction. In one embodiment, software manages a hardware BTB, e.g., with the software specifying the prediction mode or with the prediction mode defined implicitly by the mode of the instruction that writes the BTB also setting a mode bit in the entry.

As discussed below, depicted core (e.g., branch predictor 120 thereof) includes access to one or more registers. In certain embodiments, core include one or more general purpose register(s) 108.

In certain embodiments, each entry for the branch predictor 120 (e.g., in BTB 124 thereof) includes a tag field and a target field. In one embodiment, the tag field of each entry in the BTB stores at least a portion of an instruction pointer (e.g., memory address) identifying a branch instruction. In one embodiment, the tag field of each entry in the BTB stores an instruction pointer (e.g., memory address) identifying a branch instruction in code. In one embodiment, the target field stores at least a portion of the instruction pointer for the target of the branch instruction identified in the tag field of the same entry. Moreover, in other embodiment, the entries for the branch predictor 120 (e.g., in BTB 124 thereof) includes one or more other fields. In certain embodiments, an entry does not include a separate field to assist in the prediction of whether the branch instruction is taken, e.g., if a branch instruction is present (e.g., in the BTB), it is considered to be taken.

As shown in FIG. 1, the IP Gen mux 113 of IP generation stage 111 receives an instruction pointer from line 114A. The instruction pointer provided via line 115A is generated by the incrementer circuit 115, which receives a copy of the most recent instruction pointer from the path 113A. The incrementer circuit 115 may increment the present instruction pointer by a predetermined amount, to obtain the next sequential instruction from a program sequence presently being executed by the core.

In one embodiment, upon receipt of the IP from IP Gen mux 113, the branch predictor 120 compares a portion of the IP with the tag field of each entry in the branch predictor 120 (e.g., BTB 124). If no match is found between the IP and the tag fields of the branch predictor 120, the IP Gen mux will proceed to select the next sequential IP as the next instruction to be fetched in this embodiment. Conversely, if a match is detected, the branch predictor 120 reads the valid field of the branch predictor entry which matches with the IP. If the valid field is not set (e.g., has logical value of 0) the branch predictor 120 considers the respective entry to be "invalid" and will disregard the match between the IP and the tag of the respective entry in this embodiment, e.g., and the branch target of the respective entry will not be forwarded to the IP Gen Mux. On the other hand, if the valid field of the matching entry is set (e.g., has a logical value of 1), the branch predictor 120 proceeds to perform a logical comparison between a predetermined portion of the instruction pointer (IP) and the branch address (BA) field of the matching branch predictor entry in this embodiment. If an "allowable condition" is present, the branch target of the matching entry will be forwarded to the IP Gen mux, and otherwise, the branch predictor 120 disregards the match between the IP and the tag of the branch predictor entry. In some embodiment, the entry indicator is formed from not only the current branch IP, but also at least a portion of the global history.

More specifically, in one embodiment, the BA field indicates where the respective branch instruction is stored within a line of cache memory 132. In certain embodiments, a processor is able to initiate the execution of multiple instructions per clock cycle, wherein the instructions are not interdependent and do not use the same execution resources.

For example, each line of the instruction cache 132 shown in FIG. 1 includes multiple instructions (e.g., six instructions). Moreover, in response to a fetch operation by the fetch unit 134, the instruction cache 132 responds (e.g., in the case of a "hit") by providing a full line of cache to the fetch unit 134 in this embodiment. The instructions within a line of cache may be grouped as separate "bundles." For example, as shown in FIG. 1, the first three instructions in a cache line 133 may be addressed as bundle 0, and the second three instructions may be address as bundle 1. Each of the instructions within a bundle are independent of each other (e.g., can be simultaneously issued for execution). The BA field provided in the branch predictor 120 entries is used to identify the bundle address of the branch instruction which corresponds to the respective entry in certain embodiments. For example, in one embodiment, the BA identifies whether the branch instruction is stored in the first or second bundle of a particular cache line.

In one embodiment, the branch predictor 120 performs a logical comparison between the BA field of a matching entry and a predetermined portion of the IP to determine if an "allowable condition" is present. For example, in one embodiment, the fifth bit position of the IP (e.g. IP[4]) is compared with the BA field of a matching (e.g., BTB) entry. In one embodiment, an allowable condition is present when IP [4] is not greater than the BA. Such an allowable condition helps prevent the apparent unnecessary prediction of a branch instruction, which may not be executed. That is, when less than all of the IP is considered when doing a comparison against the tags of the branch predictor 120, it is possible to have a match with a tag, which may not be a true match. Nevertheless, a match between the IP and a tag of the branch predictor indicates a particular line of cache, which includes a branch instruction corresponding to the respective branch predictor entry, may about to be executed. Specifically, if the bundle address of the IP is not greater than the BA field of the matching branch predictor entry, then the branch instruction in the respective cache line is soon to be executed. Hence, a performance benefit can be achieved by proceeding to fetch the target of the branch instruction in certain embodiments.

As discussed above, if an "allowable condition" is present, the branch target of the matching entry will be forwarded to the IP Gen mux in this example. Otherwise, the branch predictor will disregard the match between the IP and the tag. In one embodiment, the branch target forwarded from the branch predictor is initially sent to a Branch Prediction (BP) resteer mux 128, before it is sent to the IP Gen mux. The BP resteer mux 128, as shown in FIG. 1, may also receive instruction pointers from other branch prediction devices. In one embodiment, the input lines received by the BP resteer mux will be prioritized to determine which input line will be allowed to pass through the BP resteer mux onto the IP Gen mux.

In addition to forwarding a branch target to the BP resteer mux, upon detecting a match between the IP and a tag of the branch predictor, the BA of the matching branch predictor entry is forwarded to the Branch Address Calculator (BAC) 142. The BAC 142 is shown in FIG. 1 to be located in the decode stage 140, but may be located in other stage(s). The BAC of may also receive a cache line from the fetch unit 134 via line 137.

The IP selected by the IP Gen mux is also forwarded to the fetch unit 134, via data line 135 in this example. Once the IP is received by the fetch unit 134, the cache line corresponding to the IP is fetched from the instruction cache 132. The cache line received from the instruction cache is forwarded to the BAC, via data line 137.

Upon receipt of the BA in this example, the BAC will read the BA to determine where the pre-selected branch instruction (e.g., identified in the matching branch predictor entry) is located in the next cache line to be received by the BAC (e.g., the first or second bundle of the cache line). In one embodiment, it is predetermined where the branch instruction is located within a bundle of a cache line (e.g., in a bundle of three instructions, the branch instruction will be stored as the second instruction).

In alternative embodiments, the BA includes additional bits to more specifically identify the address of the branch instruction within a cache line. Therefore, the branch instruction would not be limited to a specific instruction position within a bundle.

After the BAC determines the address of the pre-selected branch instruction within the cache line, and has received the respective cache line from the fetch unit 134, the BAC will decode the respective instruction to verify the IP truly corresponds to a branch instruction. If the instruction addressed by BA in the received cache line is a branch instruction, no correction for the branch prediction is necessary. Conversely, if the respective instruction in the cache line is not a branch instruction (i.e., the IP does not correspond to a branch instruction), the BAC will send a message to the branch predictor to invalidate the respective branch predictor entry, to prevent similar mispredictions on the same branch predictor entry. Thereafter, the invalidated branch predictor entry will be overwritten by a new branch predictor entry.

In addition, in one embodiment, the BAC will increment the IP by a predetermined amount and forward the incremented IP to the BP resteer mux 128, via data line 145, e.g., the data line 145 coming from the BAC will take priority over the data line from the branch predictor. As a result, the incremented IP will be forwarded to the IP Gen mux and passed to the fetch unit in order to correct the branch misprediction by fetching the instructions that sequentially follow the IP.

In certain embodiments, a branch predication manager circuit 110 allows predication of predictions, e.g., to selectively predicate a prediction to instead provide (e.g., fetch) both the to-be-taken and not-to-be-taken portions of a conditional branch, but the final execution is dependent on the branch outcome. In certain embodiments, a branch predication manager circuit 110 includes one or any combination of the following: ACB table 112, critical table 114, body-size-range to M (BSRM) table 116, tracking state 118, ACB context 119, or convergence detector 122 (e.g., including a learning table).

In one embodiment, tracking state keeps track of whether the detected re-convergence point is observed on both paths enough number of times to ascertain confidence on it. In one embodiment, the learning table is used to find the convergence (e.g., re-convergence) point when it is not known using FSM (e.g., an FSM implemented by corresponding circuitry). In one embodiment, the tracking state (e.g., convergence confidence tracking) is utilized after detecting a convergence (e.g., re-convergence) point using a learning table.

In one embodiment, a high accuracy branch predictor allows an Out-of-Order (OOO) (e.g., executing instructions in an order different from program order) processor to speculate aggressively on branches and gain significant performance with a high level processor depth and width. Unfortunately, there still remains a class of branches that are hard to predict for branch predictors. These branches cost an OOO processor not only performance but also significant power overheads because of pipeline flush and re-execution when speculation goes wrong. In one embodiment, a first processor that three times wider and deeper than a second processor is almost two times more speculation bound than the second processor. Certain embodiments or processors need mitigation of branch mis-speculations, especially for future OOO processors that may scale deeper and wider.

One possible solution to this problem is to limit speculation when a hard to predict branch is encountered. One approach to achieve this is to predicate conditional branches in software. In certain embodiments, predication allows fetching both the taken and not-taken portions of a conditional branch, but the execution is conditional based on the final branch outcome. Because predication inherently limits instruction level parallelism, it can be detrimental to overall performance. Further, certain embodiments of predication introduce data dependencies in program execution. which may, in turn, end up creating new bottlenecks in performance. As a result, performance losses may appear in certain applications. Certain predication techniques need significant changes not just to the hardware but also to the compiler and the instruction set architecture (ISA), which makes their implementation challenging.

Certain embodiments herein use the notion of program criticality to do a fundamental analysis of the performance trade-offs created by limiting speculation. Based on this analysis, a processor may utilize Auto-Predication of Critical Branches (ACB) as discussed herein to intelligently disable speculation only on branches critical for performance. Embodiments of ACB needs no compiler or ISA support and have a simple micro-architecture which may make it very attractive for implementation in an OOO processor. Specifically, certain embodiments herein:

1. Use the notion of critical paths to present a simple, yet rigorous, understanding of the trade-offs of disabling speculation on a branch critical for performance. Guided by this understanding, one embodiment of ACB is a light-weight mechanism that intelligently decides whether limiting speculation for a given critical branch is helpful or detrimental to performance. ACB is a holistic and complete solution that mitigates performance losses by wrong speculation, while ensuring such mitigation in itself does not create performance inversions.

2. Can be implemented in an OOO processor with minimal changes to the hardware and no ISA or compiler support. In certain embodiments, ACB learns its targeted critical branches, and uses a novel hardware mechanism to accurately detect control flow convergence using just three generic patterns of convergence discussed herein, e.g., unlike an approach that relies on control flow analysis by the compiler. Certain embodiments of ACB then use minor modifications in the Fetch and OOO pipelines to disable speculation on certain critical branches, thereby reducing pipeline flushes because of wrong speculation.

3. Certain embodiments of ACB utilize a unique, dynamic monitoring mechanism (dynamo) that monitors, at run-time, the actual performance delivered by applying ACB on any targeted branch. In one embodiment, when dynamo finds ACB predication is responsible for performance degradation, it promptly throttles ACB for that branch, thereby preventing negative performance outliers. In certain embodiments, dynamo monitors dynamic performance delivered by a given feature at run-time and uses this knowledge to make informed decisions. Dynamo's generic approach can be applied to throttle any micro-architectural feature which similarly requires balancing of performance-costs trade-off.

In one embodiment, a branch predictor uses program history to predict future outcomes of a branch, but there remains a class of branches that are still hard to predict. Many such branches are data dependent branches and are difficult to predict using just program history.

In one example, a proper subset (e.g., 64) of branch instructions (for example, identified by instructions pointers (IPs), e.g., program counters (PCs)) contribute to more than 95% of all dynamic mispredictions. Hence, tracking the proper subset (e.g., top 64) of hard to predict branches cover the majority of the mispredictions. In another example, 98% of the total mispredictions come from direct conditional branches, of which 72% comes from convergent conditional branches. Convergent conditional branches refers generally to those branches whose taken and not-taken paths can converge to some later point in the program (e.g., within a distance of 120 instructions from the branch). In this example, loops are naturally converging and contribute to another 13%, and the remaining 13% branches (out of 98%) exhibit non-converging control flows. This signifies how a majority of mis-speculations can be covered by targeting a small proper subset of (e.g., 64) convergent conditional, hard to predict branches. However, instead of focusing on all hard to predict branches, certain embodiments herein target only a proper subset of hard to predict branches that are most critical for performance.

In certain embodiments, the performance of an OOO core is bound by the critical path of execution. Criticality can be described with the program's data dependency graph (DDG).

Figure 2:
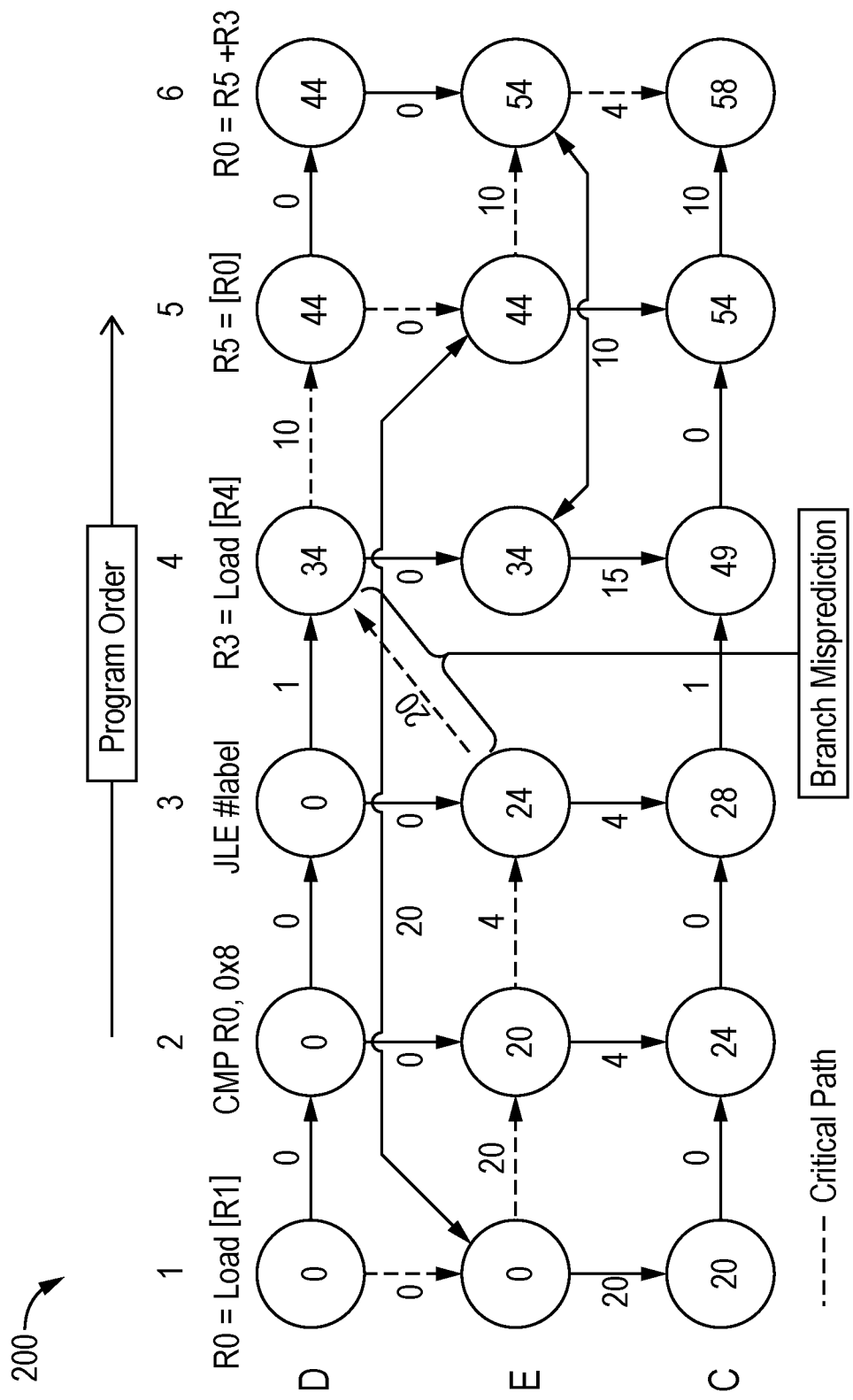
FIG. 2 illustrates a data dependency graph that depicts the effect of branch misprediction on the E-D edge on a program critical path according to embodiments of the disclosure.

FIG. 2 illustrates a data dependency graph 200 that depicts the effect of branch misprediction on the E-D edge on a program critical path according to embodiments of the disclosure. Each instruction in data dependency graph 200 has three nodes. The D node denotes allocation into the OOO, the E node denotes the dispatch of the instruction to the execution nodes, and the C node denotes the writeback (e.g., retirement) of the instruction. An E-E edge denotes a data dependency, C-C edges denote in-order commit and D-D nodes are for in-order allocation into the OOO. A wrong speculation is inferred by an E-D edge, whereas the depth of the processor is factored in by the C-D edge. The weight of the E-D edge is an example pipeline flush latency on branch misprediction. Finally, critical path here is the maximum weighted path in the DDG from a program's beginning to its end. Any instruction that appears on this path (or paths) is critical in this figure.

As can be seen from FIG. 2, the E-D edge, because of wrong speculation on branch instruction-3, creates a critical path in the processor. However, the critical path not only includes the E-D edge weight (e.g., flush latency), but also the latency of the instructions that create sources for the mispredicting branch. This is a very important observation as it implies that not all branch mispredictions matter equally for performance. Those hard to predict branches that take a longer time to execute in the OOO (e.g., because the sources of the branch take longer to execute) are more harmful for performance.

One solution to the branch misprediction problem is to prevent speculation when a hard to predict branch is encountered. For example, software predication providing both the taken and not-taken portions of a conditional branch, but the final execution is dependent on the branch outcome. In certain embodiments, predication helps prevent pipeline flushes because of wrong speculation, but it substitutes control dependencies with data dependencies in the execution of the program, thereby limiting instruction level parallelism and affecting performance. To mitigate this, one approach applies predication only on those branches that have low confidence of prediction.

In one embodiment, "wish" branches rely on the compiler to create predicated code for every instance of a branch. However, a run-time monitoring of branch confidence is used to fetch predicated code, instead of the normal code, whenever the branch predictor is found to be not confident enough. In certain embodiments, a Diverge-Merge Processor (DMP) improves upon wish branches. Instead of the compiler creating predicated code (which increases the code footprint), DMP envisages the compiler to learn and modify the ISA to supply the re-convergence point for converging branches that are found to be mispredicting frequently during application profiling. Using this information, DMP then modifies the processor's fetch pipeline to fetch both the taken and not-taken portions of the conditional branch. Register Aliasing Table (RAT) in the OOO is duplicated and both the paths are renamed separately. The hardware then injects select instructions that predicate the data outcome of both the taken and not-taken portions.

By monitoring branch confidence at run-time, DMP effectively predicates only the hard to predict branches and delivers significant performance. However, predication-based strategies like DMP can create new critical paths of execution, which are difficult to comprehend just by monitoring branch confidence. As a result, application of DMP and similar schemes may result in performance inversions on certain workloads. Moreover, in certain embodiments, DMP requires the OOO to duplicate the RAT and needs forking of fetch routines. In certain embodiments, extra select micro-operations (μops) also need to be inserted in the program flow in the OOO. Apart from hard-ware changes, DMP also needs modifications to the compiler and the ISA. All this makes the practical implementation of the scheme challenging. Certain embodiments herein of ACB overcome these limitations.

Dynamically applying predication to only hard to predict branches can help mitigate the penalty of wrong speculation. However, since predication can cause performance inversions, it is imperative to have mechanisms that can accurately comprehend the delicate performance trade-offs created by performing predication. Additionally, (e.g., to encourage usage on processors), it is desirable that techniques of ACB are easy to implement completely in hardware, without needing support from the compiler or modifications to the ISA. Below discussed program criticality to first develop an understanding of how predication changes the critical path of execution.

Predication, e.g., by fetching both the taken and not-taken paths of a branch, alters the critical path of execution. FIG. 3A demonstrates change in critical path due to extra-allocation by predication, in FIG. 3B shows an example of a perfectly correlating branch following a predicated branch, and FIG. 3C shows an example where a critical long-latency load is dependent on a predicated branch outcome according to embodiments of the disclosure. In one embodiment of FIGS. 3B and 3C, each instruction uses its right-most logical register as the destination.

FIG. 3A shows an example DDG with and without predication. Without predication on hard to predict branches, the critical path of execution takes the E-D edge, corresponding to wrong speculation. Whereas with predication, the critical path goes through the D-D edges of the DDG. With predication, in certain embodiments, more instructions need to be allocated and fetched into the OOO machine, whereas the baseline will only fetch the predicted path. Hence, the number of nodes in D-D chains of DDG will increase and may affect the critical path.

Assume the misprediction rate for a given hard to predict branch is mispred_rate and both the taken and not-taken paths of the branch have T and N instructions respectively, and assume p to be the probability of the branch being taken. With predication, in certain embodiments, there is a need to fetch (T+N) instructions for every predicated instance. Denote alloc_width as the maximum number of instructions that can be allocated in the OOO in a given cycle and mispred_penalty as the penalty of pipeline flush on misprediction (E-D edge-weight). Assume that the sources of the branch do not take any time to execute (e.g., E-E edge-weights are 0 in the critical path). Hence, for the baseline, misprediction increases the critical path of execution by (mispred_rate·mispred_penalty) cycles. On the other hand, with predication, the critical path increases by ((T+N)−(p·T+(1−p)·N))/alloc_width. Hence, in one embodiment, predication will be profitable if:

$$\left(\left(\frac{1-p \cdot T + p \cdot N}{alloc\_width}\right)\right) \leq (\text{mispred\_rate} \cdot \text{mispred\_penalty}) \quad (1)$$

The (1) above clearly shows the trade-off between higher allocations and saving the pipeline flushes by mispredictions. Assume that the allocation width (alloc_width) is 4, the pipeline flush latency (mispred_penalty) is 20 cycles and has an equal probability of predicting taken and not-taken. If misprediction rate (mispred_rate) is 10%, then predication will be beneficial only if the total instructions in the predicated branch body (taken and not-taken paths combined (T+N)) are less than 16. On the other hand, if branch body size is larger, e.g., 32 instructions, then predication should be applied only for branches having misprediction rate greater than 20%. Realistically, the actual penalty for a branch mis-prediction may be higher than just the pipeline flush latency, as it includes the E-E edges (latency of the sources of the branch). Hence (1) will have a higher value for the parameter mispred_penalty, and predication may be able to tolerate a larger number of extra allocations. Therefore, concluding that both misprediction rate and an estimate of the size of the branch body need to be considered to qualify a given hard to predict branch for dynamic predication. For other micro-architectures that allocate in OOO in terms of micro-operations, (1) may be suitably adjusted.

In certain embodiment, not all mispeculations lie on the critical path. Some-times, branch mispredictions may be in the shadow of other critical chains, for example load misses. In such cases, the E-D edge of the DDG will not lie on the critical path as the latency of branch misprediction repair will be absorbed within the latency of the load miss. Hence, in certain embodiments it is important to target predication only on that subset of hard to predict branches which is critical for performance. Below describes a heuristic to segregate critical branches from hard to predict branches.

FIG. 3B shows a sample program where branch B1 frequently mispredicts. Since B1 is a small hammock, it should be amenable to dynamic predication. However, there is another branch B2 that is perfectly correlated with B1, but is not amenable to predication. Interestingly, in the baseline, B2 usually does not see any misprediction since B1 is more likely to execute (and cause pipeline flushes) before B2 can be executed. Perfect correlation between them would mean that B2 will always be correctly predicted when it is re-fetched, since it knows the outcome of B1. This happens because the global branch predictor would repair the prediction of B1 when there is no predication (since global history is updated), and B2 will always learn the correlation with B1.

With predication, however, there is no update to global history from B1 and hence, B2 will start mispredicting. Therefore, the effective number of wrong speculations will not come down. In fact, because of predication on B1, B2 will now take a longer time to execute, thereby elongating the critical path. Hence, branches like B1 should not be predicated, unless B2 can also be predicated. Note that there can be instances where B2 may be able to execute earlier than B1 in the OOO and create mis-speculation flush. But because B1 is older than B2, and they are perfectly correlated, B1 will yet again cause a new pipeline flush, and hence, the pipeline flushes by B2 do not contribute to any performance penalty.

FIG. 3C shows another example where the body of a hard to predict branch creates sources for a critical (e.g., long latency) load. Without predication, the load would still be launched, and may be correct if the branch prediction was correct. However, due to predication, this long latency load's dispatch is dependent upon the execution of the predicated branch. As a result, the critical path of execution may get elongated. If this hard to predict branch is very frequent, predication can result in a long chain of dependent instructions. In all such scenarios, resorting to branch prediction, even if the accuracy of prediction is low, may be a more optimal solution than predication.

In certain embodiments, ACB includes (i) segregating critical branches from hard to predict branches, (ii) utilizing selection criteria for critical branches that takes into account the size of the branch body and the misprediction rate, and (iii) detecting alterations to the critical path due to predication at run-time. In certain embodiments, predication is dynamic and completely implementable in hardware.

In certain embodiments, ACB eliminates speculation when the criteria discussed above are satisfied. In one embodiment, ACB first detects conditional critical branches and then uses its novel hardware mechanism to find out the point of re-convergence for each conditional critical branch. Thereafter, in certain embodiments, ACB causes a fetch of both taken and not-taken portions up to the re-convergence point of the conditional branch. After the ACB branch executes in the OOO execution stage, the correct path is executed, whereas micro-architectural modifications in the pipeline make the wrong path transparent to program execution in one embodiment. In certain embodiments, dynamic monitoring (dynamo) monitors the runtime performance and appropriately throttles ACB. Below describes example micro-architecture of ACB in more detail.

Learning Critical Branches

To track critical branches, certain embodiments of ACB use a direct mapped Critical Table (e.g., critical table 114 in FIG. 1) indexed by the program counter (e.g., instruction pointer) of mispredicting conditional branches. In one embodiment, each table entry stores an (e.g., 11 bit) tag to prevent aliasing, a (e.g., 2 bit) utility counter for managing conflicts, and a (e.g., 4 bit) saturating critical counter. Certain embodiments herein consider a branch mis-speculation event to be critical only if, at the time of misprediction, the branch is within a proper subset (e.g., a fourth) of the re-order buffer (ROB) size from the head of the ROB (e.g., the oldest entry in the ROB). In certain embodiments, those mispredictions which happen near the head of the ROB are more critical to performance as they will cause a greater part of ROB to be flushed and consequently, more control independent work to be wasted. On the contrary, mispredictions happening near the tail of the ROB are not critical as they are likely in the shadow of some other critical instruction that is currently stalling the retirement in certain embodiments. On top of this, certain embodiments of ACB qualify a branch to be critical only if it displays a minimum number (e.g., 16) of such misprediction events in an observation window of (e.g., empirically derived) (e.g., 200,000) retired instructions. At the end of this window, the entire table is reset to learn new critical branches in one embodiment.

In one example, every critical mis-speculation increments both the critical counter and the utility counter by one. In case of conflict misses in the table, utility counter is decremented in this example. An old entry will be replaced by a new contending entry only if the utility counter is zero in this example. A small (e.g., 64-entry) critical table is used to providing useful coverage for performance in one embodiment. In certain embodiments, in any given window, only those critical entries which possess a saturated critical counter can qualify for learning for convergence.

Learning Convergent Branches

Certain embodiments of learning in ACB involves identifying convergent candidates among the critical branches residing in the critical table. In one embodiment, compiler generated control flow graph analysis provides these candidates. However, in another embodiment, ACB is to detect this information completely in hardware for a practical implementation of ACB.

Through analysis of various control flow patterns in different workloads, three generic cases are identified by which conditional direct branches can converge.

Figure 4:
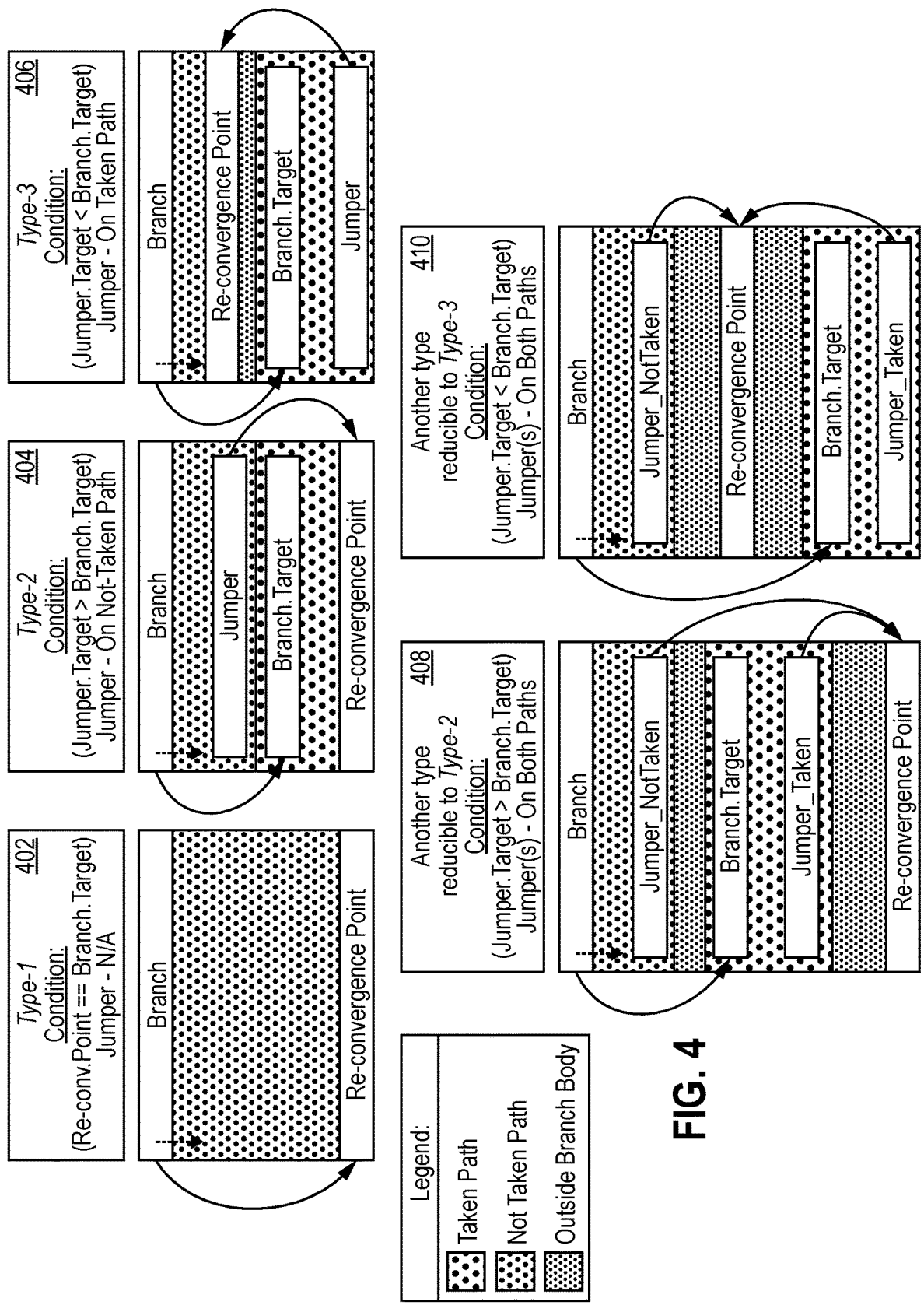
FIG. 4 illustrates three types of convergence of forward-going, conditional direct branches according to embodiments of the disclosure.

FIG. 4 illustrates three types of convergence of forward-going, conditional direct branches according to embodiments of the disclosure, referred to herein as Type-1, Type-2 and Type-3. FIG. 4 shows generalized templates of different compiled code layouts illustrating the different types of convergences. Other complex convergence patterns (e.g., rightmost two 408, 410) can also be condensed (e.g., reduced) into the same set of Types.

In one example: Type-1 convergence pattern 402 is characterized by the re-convergence point being identical to the main-branch target. The simplest form of Type-1 branches are IF-guarded hammocks that do not have an ELSE counter-part. Type-2 convergence pattern 404 is characterized by the not-taken path having some jumper branch, which when taken, has a branch-target that is ahead of the main-branch target. This naturally guarantees that the taken path which starts from the main-branch target will fall-through to meet the jumper branch target, making it the re-convergence point in this case. Type-2 covers conditional branches having pair of IF-ELSE clauses. Finally, Type-3 convergence pattern 406 possesses a more complex control flow pattern (which can have either IF-only or IF-ELSE form). It is characterized by the taken path encountering a jumper branch which takes the control flow to its target that is less than the main branch target. This form ensures that the not-taken path naturally falls through to meet the jumper branch target. Certain embodiments herein generalize these three types so that other complex cases can also be contained within this set (as shown in FIG. 4).

Re-Convergence Types:

One embodiment herein utilizes three broad control flow patterns occurring in direct conditional branch cases that have been abstracted as three convergence types under which any general re-convergence can be classified if a convergence happens for a branch. These three convergence types exist to differentiate the identity of re-convergence point and to distinguish how the two taken and not-taken path reach the re-convergence point, e.g., based on the assumption that for direct conditional branches, if there exists a convergence point, then there must be at least be one branch/jump instruction on either path which must take us to the re-convergence point. This observation must hold true for any program which proceeds linearly. FIG. 4 illustrates the differences between the three types that are referred to herein as Type-1, Type-2, and Type-3 respectively.

In FIG. 4, "Taken Path" denotes the set of IPs which follow the conditional branch when the control flow proceeds on its Taken direction until (and not including) the re-convergence point. Similarly, the notion of "Not-Taken Path" is defined. It is to be noted that there are no restrictions on the instructions that can lie on either path, e.g., they can include other branches as well which may direct the control flow according to their direction. The below also refers to the branch in focus (whose re-convergence point is needed to be found out) as the main branch.

In another example:

Type-1 convergence is characterized by the re-convergence point simply being the target of the main branch. In this case, the Not-Taken Path will have some non-zero size. But the Taken Path has no instructions in its body. In the source code from which this compiled code emerges, this is supposed to represent simple hammocks where we have "if" conditional statements guarding a small code section but does not have an "else" counter-part, e.g., the main branch is the jump here on the taken path which goes to the re-convergence point. Type-2 convergence is characterized by the Not-Taken Path having some taken branch (x) which leads to a branch target IP more than the target IP of the main-branch. This naturally guarantees that the taken path which starts from the main-branch target will likely fall-through to meet the target of this branch x, which will become the re-convergence point. Similarly, the original source code generating this type of convergence pattern is an "if-else" pair of conditional statements. Here, there are non-zero sizes for both the taken and not-taken paths. Type-1 will look like a special case of Type-2 where the taken path has zero size. For distinction with respect to the presence of a plurality of non-zero paths leading to convergence, it may be desired to separate the notions of Type-1 and Type-2. More importantly, an important instruction in this scenario is the branch x on the not-taken path which takes the flow to the re-convergence point. This branch x which makes us to go the re-convergence point upon being taken is identified and termed as the "jumper" branch.

Type-3 is characterized by the Taken Path encountering the jumper branch x which directs the control flow (e.g., upon being taken) to a target IP less than the target IP of the main branch. This form ensures that the Not-Taken Path naturally falls through to meet this same target of the jumper branch. So, the main distinguishing and important element is the fact that this jumper lies on the taken path, instead of the jumper lying on the not-taken for Type-2. Inspection of various compiled code causing Type-3 convergence reveals both "if"-only and "if-else" type conditional statements which a compiler may rearrange (e.g., for some code-optimization) to make it non-contiguous in its appearance.

Two examples 408, 410 in FIG. 4 which appear different than the conventional forms described for the three Types because both the Taken Path and Not-Taken Path have jumper-branches in these cases and the re-convergence point can be anywhere with respect to the target of the main branch. But using the comparative condition of comparing the target IP of the jumper with respect of the target IP of the main branch, they can be classified and detected similarly using an FSM as Type-2 in 408 or Type-3 in 410.

Figure 5:
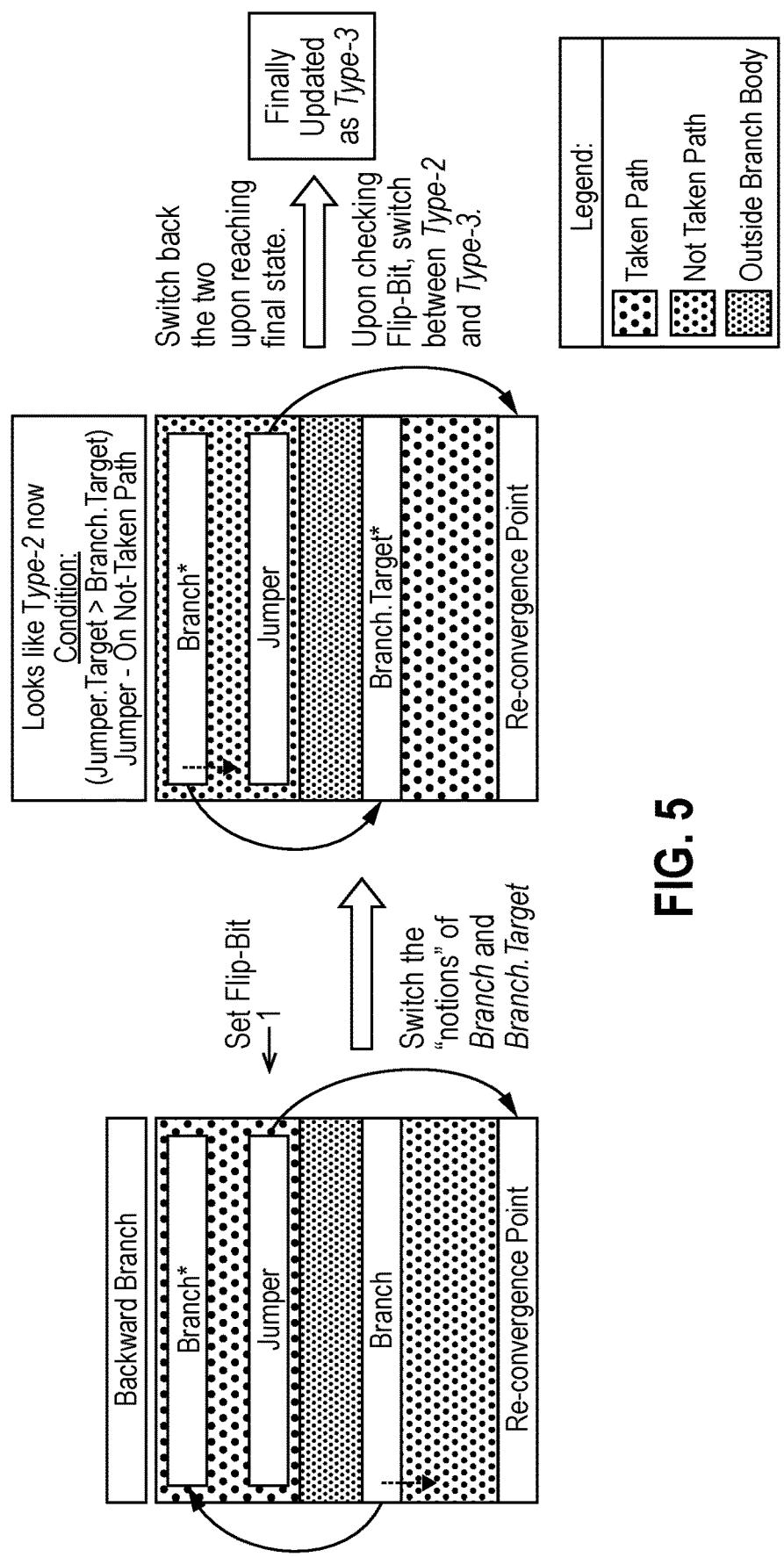
FIG. 5 illustrates using a type of convergence of forward-going, conditional direct branches for backward-going, conditional direct branches according to embodiments of the disclosure.

However, the above description may define conditions that hold true for only forward-going branches (where the main-branch target IP (e.g., PC) is more than the branch IP (e.g., PC). To cover the cases of backward-going branches, certain embodiments, of ACB exploits the symmetrical nature of convergence for backward-going branches. Thus, by interchanging the notions (e.g., perspective) of a (e.g., main) branch instruction and its target instruction (along with taken and not-taken directions while recording path IPs (e.g., PCs)) for such branches, the variability of their convergence can be encompassed into the same mechanism and reduce them to be detected as Type-2 or Type-3. FIG. 5 illustrates this by using an example. Particularly, FIG. 5 illustrates using a type of convergence of forward-going, conditional direct branches for backward-going, conditional direct branches according to embodiments of the disclosure.

In one embodiment, the convergence detection mechanism (e.g., convergence detector) is implemented during (or before) fetch where it needs to track only the IPs (e.g., PCs) of instructions being fetched. When an entry in the critical table saturates its critical count, the branch IP (e.g., PC) is copied into a single entry learning table (e.g., in convergence detector 122) which is occupied until confirming convergence or divergence for its two paths. The mechanism first tries to learn if the branch (referred to herein as the main-branch) is a Type-1 or Type-2 convergence. It begins by first inspecting the Not-Taken path. The first N fetched IPs (e.g., PCs) following the main-branch are tracked. If receiving the target of the main-branch within this interval, classify it as Type-1 and finish learning. Otherwise, if another taken branch is observed whose target is ahead of the main-branch's target, then record this branch's target as the re-convergence point. Then validate the occurrence of the same re-convergence point on the next instance when the main-branch fetches the Taken direction, within the same N instruction limit, before confirming it as Type-2. If neither Type is confirmed, leave the main-branch as unclassified.

If still unclassified in this example, finally try to learn it as Type-3 by inspecting the Taken path. If, within N instructions, observe a taken branch whose target is before the main-branch, then record this branch's target as the re-convergence point. Then validate the occurrence of the same re-convergence point on the next instance when the main-branch fetches the Not-Taken direction. Upon detecting success in this process, confirm it as Type-3.

At any stage, if exhaustion occurs of the N instruction counting limit, reset the learning table entry as a sign of non-convergence. Upon any confirmation of Type, copy the branch IP (e.g., PC) to a new ACB Table (e.g., ACB table 112 in FIG. 1) entry, along with the learned convergence information. Then vacate the corresponding critical table entry and reset the learning table entry. Note that the same mechanism works for back-branches with the small changes as described through an example in FIG. 5. In one embodiment, the optimal value of N is 40.

In one embodiment, criticality related confidence is built in a (e.g., 32-entry) 2-way ACB Table (e.g., indexed using branch IPs (e.g., PCs)) using a (e.g., 6-bit) saturating probabilistic-counter. All the metadata needed to fetch both the paths upon ACB application on a targeted branch IP (e.g., PC) is also stored in the ACB table entry (detailed composition example in Table 1 below) in certain embodiments. Before ACB predication is applied on any entry, in one embodiment, ACB circuitry (e.g., branch predication manager 110 in FIG. 1) establish confidence in accordance with the trade-off described by (1) above. During learning, record the combined body size of both paths that need to be fetched (e.g., encoded in 2 bits) and proportionally set the required misprediction rate m for this branch, using a static mapping of Body-Size-to-Misprediction-Rate (refer to Table 1). In one embodiment, the confidence counter in the ACB table is incremented for every mis-predicting instance of this branch that triers a pipeline flush. It is decremented probabilistically by 1/M (where $$m = \frac{1}{M+1}$$

on every correct prediction. When this counter becomes higher than half of its saturated value (e.g., 32), start applying ACB predication in certain embodiments.

The same counter also builds confidence on convergence. While the confidence counter is between 0 and 32, track the occurrence of the recorded re-convergence point PC on the dynamically observed taken and not-taken paths of the branch in one embodiment. If the learned convergence does not happen, reset its confidence counter. This excludes branches from getting activated which tend to diverge more often.

Run-Time Application
Fetching Both Taken and not-Taken Paths

After learning branches that are candidates for ACB, fetch both the taken and not-taken paths for every branch instance dynamically. On the fetch of a branch instruction, which has reached confidence in the ACB table, open an ACB Context that records the target of the branch (from the branch target array), and the re-convergence point (from the ACB table). If the branch is Type-1 or Type-2, override the branch predictor decision to first fetch the not-taken direction. If it is Type-3, fetch the taken direction first. If the convergence was Type-1, then it will naturally reach the PC for the point of convergence. For convergences of Type-2 and Type-3, wait for fetching the jumper branch which is predicted taken and whose target is the expected re-convergence point. This jumper may be a different branch than what was seen during training. Having found the jumper which will take us to the point of re-convergence, now override the target of this jumper branch to be either the ACB-branch target (in case first fetched not-taken direction) or the next PC after the ACB-branch if first fetched the taken direction. This step is needed to fetch the other path. Once the convergence PC is reached, the ACB Context is closed and wait for another ACB branch instance. The ACB branch, the jumper branch and the re-convergence point instructions are all attached with a 3 bit identifier so that the OOO can completely identify the ACB body.

It is sometimes possible that the re-convergence point on either path is not reached. In such cases the front-end only waits for a certain number of fixed instructions (e.g., empirically determined as 60). If convergence is not detected, attach an identifier with the next instruction signaling a divergence. When the OOO receives such a signal, it forces a mis-speculation on the ACB-branch when it executes and continues fetching from the correct target normally thereafter. At this point, reset the confidence and the utility bits in the ACB Table to let it relearn. Since detect divergences during learning, divergence injected pipeline flushes are rare and do not hurt performance in certain embodiments.

Effective Predication in the OOO

In certain embodiments, context management in the OOO simply relies on the ACB identifiers set during fetch. The ACB-branch is stalled at scheduling for dispatch until either the re-convergence-point or the divergence-identifier is received. This waiting for ACB-branch is needed since a failure in convergence implies ACB's inability to fetch correctly. To recover, force a pipeline flush on diverging ACB branch instances once their direction is known upon execution.

All instructions in the body of the ACB-branch are forced to add the ACB-branch as a source effectively stalling them from execution until the branch has actually executed. Instructions post the ACB re-convergence point are free to execute. If they have true data dependencies with either taken or not-taken paths of the ACB branch, they will be naturally stalled by the OOO. Once the branch executes, instructions on the correct path execute normally. However, since the wrong path was also allocated and OOO may have already added dependencies for the correct path with the wrong path, need to ensure register transparency beyond the wrong path.

To solve this problem, every instruction in the body of ACB that is a producer of some logical register or flags, treats the logical destination as an additional source in certain embodiments. For example, an instruction of the type mov RAX, RBX will now have two sources, the original source RBX and the extra source RAX (which is its destination). When this transformed ACB body instruction is identified as belonging to the correct path, will discard the artificial source and let it execute normally as a move from RBX to RAX. If, however, it instead turns out as a wrong path instruction, then will ignore the original sources and it will act as a special move from RAX to RAX. One should note that this is not a trivial instruction—it copies the last produced value of RAX to the register allocated to it for writing RAX. Since RAT provides us with the last writer to a given register during OOO allocation, obtain the last correctly written register ID from the RAT during register renaming. Hence, the wrong path is able to propagate the correct data for the live-outs it produces, making it effectively transparent. Any instruction on the wrong path, that does not produce register or flags (like stores or branches), releases its resources. Using these simple micro-architectural changes, are able to overcome the challenge of register transparency without resorting to complex RAT recovery mechanisms or re-execution.

Run-Time Throttling Using Dynamo

Even though embodiments of ACB remove mis-speculations, they may end up creating artificial data dependencies which can have undesirable side effects on performance in certain embodiments. Hence, certain embodiments monitor and throttle ACB's application at run-time. However, performance can be affected by various diverse phenomena which monitoring of a few local heuristics cannot accurately comprehend. In fact, this is a generic problem that affects many other micro-architectural features which suffer from an imbalance in performance-costs trade-off in their application.

Certain embodiments herein utilize novel dynamic monitoring (dynamo) to monitor the run-time performance delivered by ACB. Dynamo is a first of its kind predictor that tracks actual performance and compares it with baseline performance.

Figure 6:
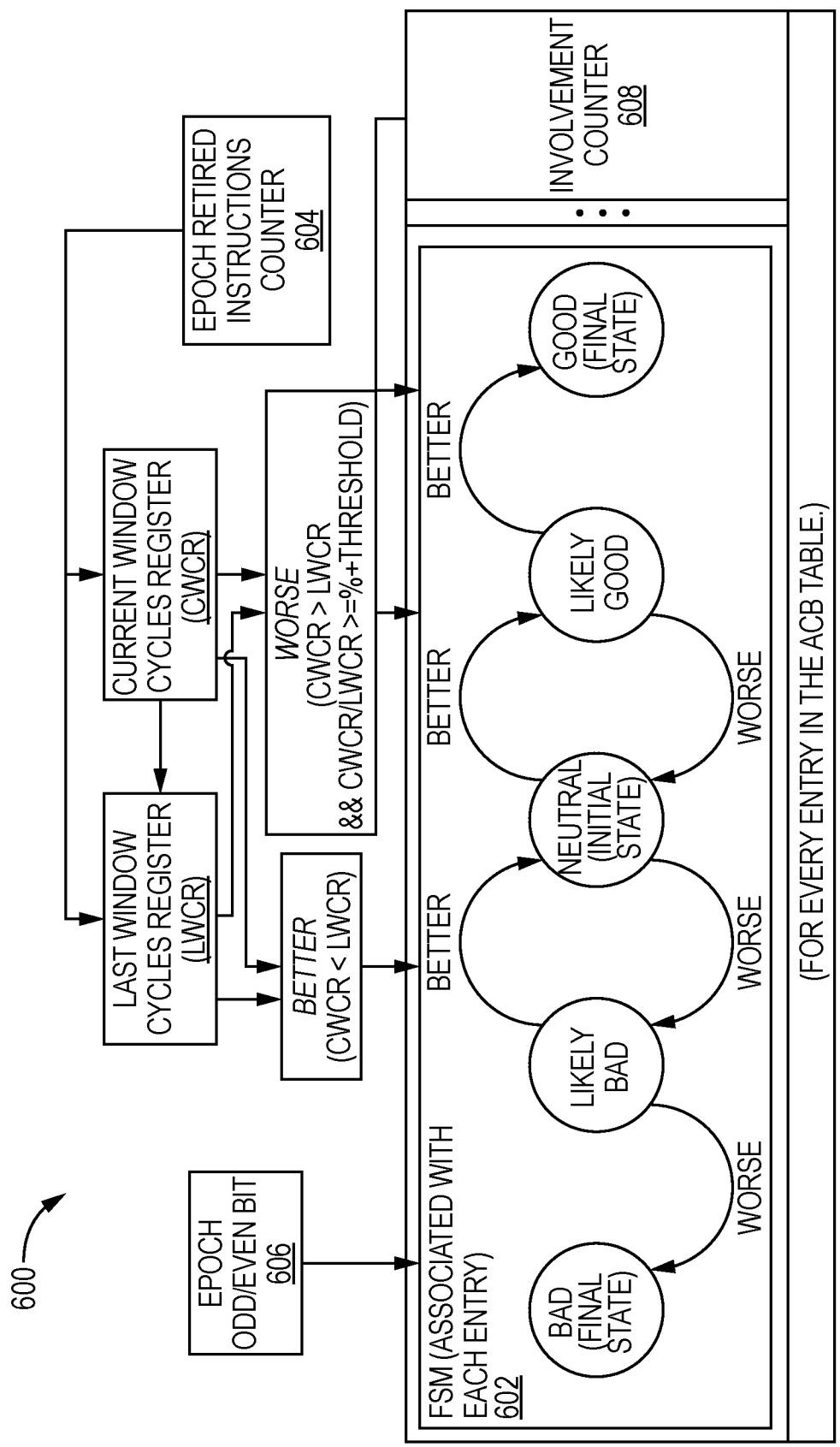
FIG. 6 illustrates dynamic monitoring elements of auto-predication of critical branches (ACB) circuitry according to embodiments of the disclosure.

FIG. 6 illustrates dynamic monitoring elements 600 of auto-predication of critical branches (ACB) circuitry according to embodiments of the disclosure. More particularly, FIG. 6 describes examples of the various elements of dynamo and their interactions. In one embodiment, dynamo assumes a 3-bit state for each entry in the ACB Table, namely NEUTRAL, GOOD, LIKELY GOOD, LIKELY BAD, and BAD. The FSM-state 602 transitions happen for all entries together at every W instructions retired, which call as one epoch. Entries which are in the confirmed states (e.g., GOOD and BAD) do not undergo transitions. In one embodiment, a best value of the epoch-length is about 16,384 instructions.

In one embodiment, dynamo computes the cycles taken to complete a given epoch using a (e.g., 18 bit) saturating counter 604. Allocation in the ACB Table initializes each entry with NEUTRAL state. For the odd-numbered epoch (e.g., as indicated by odd/even bit 606), dynamo disables ACB for all the branches except those in GOOD state. In this epoch, the base-line performance would be observed. For the even-numbered epoch, dynamo enables ACB for all the branches except those in BAD state. At the end of every odd-even pair of epochs, dynamo checks the difference in cycles between the two. If the cycles have increased due to enabling ACB by a factor (e.g., of ⅛) (e.g., an empirically set threshold) or more, then it means that doing ACB for this set of unconfirmed branches is likely bad and dynamo transitions the state of all the involved ACB-branches towards BAD. On the other hand, if the cycles have improved due to ACB, then dynamo moves the state of all the involved ACB-branches towards GOOD.

To define enough involvement of any ACB branch in any epoch, dynamo also counts the per-instance activity of each ACB branch using a (e.g., 4 bit) saturating counter 608, which is incremented on every fetching of ACB branch when ACB is applied. Certain embodiments use involvement criteria to make sure to not account for IPC fluctuations (noise) or natural program phase changes to affect dynamo's judgment. To make it even more robust, certain embodiments of dynamo do not directly transition any branch to the final (e.g., GOOD or BAD) states. Instead they may rely on observing positive or negative impacts of the branch consecutively to obtain a final decision regarding GOOD or BAD. Branches in GOOD state will perform ACB while those in BAD state are disabled henceforth. Note that if this degradation factor is between 0 and ⅛, then do not update states in either direction and continue with the next epoch-pair.

Also, since program phase changes can potentially change the criticality of some branches, this may provide a fair chance to the blocked candidates to re-learn through dynamo. In one embodiment, reset dynamo state information for all entries after every selected number (e.g., 10 million) of retired instructions.

Figure 7:
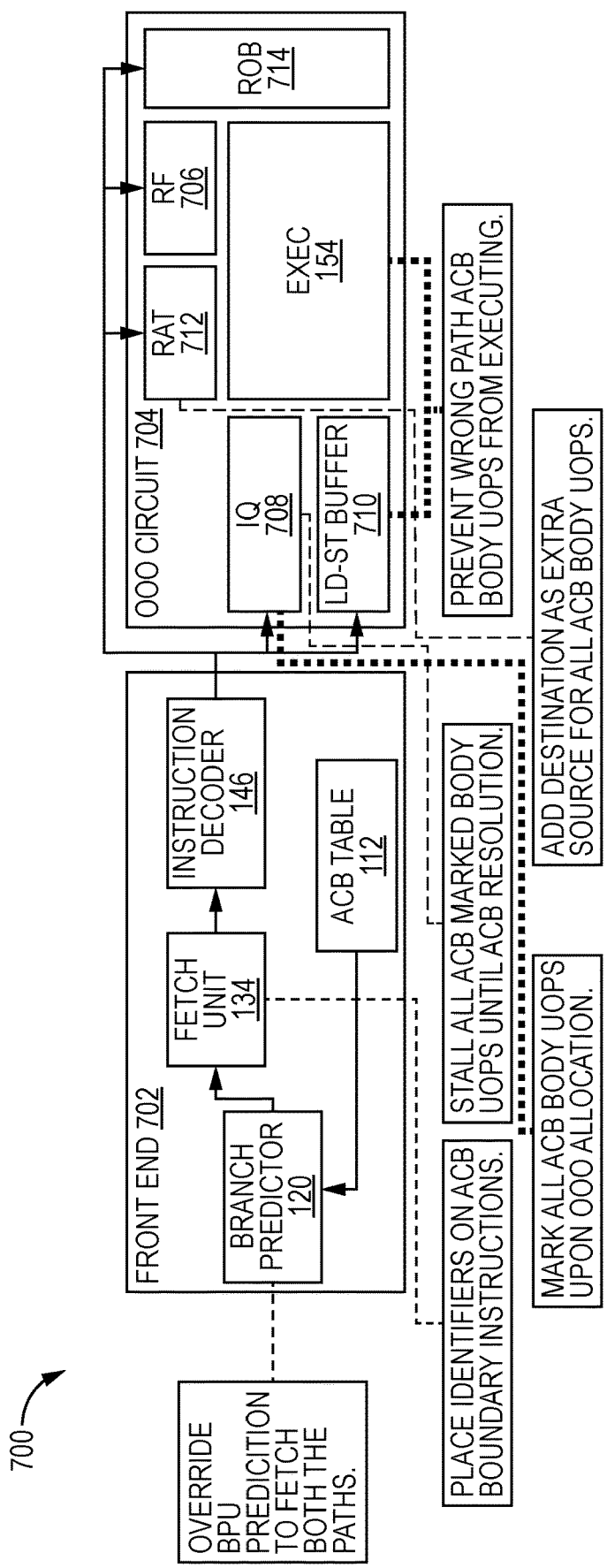
FIG. 7 illustrates micro-architectural interactions of auto-predication of critical branches (ACB) circuitry with pipeline stages of a processor core according to embodiments of the disclosure.

An overview of the ACB's interaction at various pipeline stages of a processor core and the important micro-architectural changes it involves can be visualized through FIG. 7. FIG. 7 illustrates micro-architectural interactions of auto-predication of critical branches (ACB) circuitry with pipeline stages of a processor core 700 according to embodiments of the disclosure. Processor core 700 includes a front end 702 with a branch predictor 120, fetch unit 134, instruction decoder 146, and an ACB table 112, and an Out Of Order (OOO) circuit 704 including register file (RF) 706, instruction queue (IQ) 708 (e.g., storing instruction pointers for the next instructions to be executed), load-store buffer 710, register alias table (RAT) 712, and re-order buffer (ROB) 714.

Example Area Calculations

Table 1 describes example hardware elements used by ACB in detail. Aggregate storage needed by ACB is just 384 bytes in one embodiment. These structures may be part of (or coupled to) a branch predication manager (e.g., branch predication manager 110 in FIG. 1).

TABLE 1

Details of structures used by ACB.

| Structure | Per-entry Fields (with bit-size) |
|---|---|
| Critical Table (64 entries, 144B) | Valid (1 b), Tag (11 b), Utility (2 b), Critical_Counter (4 b) |
| ACB Table (32 entries, 188B) | Valid (1 b), Tag (11 b), Utility (2b), Conv_Type (2 b), Reconv_PC (16 b), Confidence (6 b), FSM_State (3 b), Involv_Count (4 b), Mispred_Code (2 b) |
| Learning Table (1 entry, 18B) | Valid (1 b), Candidate (64 b), BrTarget (32 b), BrNextPC (32 b), Flip_Bit (1 b), Likely_Type (3 b), Tracking_Active (1 b), Inst_Counter (5 b) |
| Tracking State (1 entry, 9B) | Valid (1 b), Candidate (64 b), Fetch_Dir (1 b), Inst_Counter (5 b) |
| ACB Context (1 entry, 21B) | Valid (1 b), Active_ACB (64 b), Conv_Type (2 b), Reconv_PC (64 b), BrTarget (32 b), BrNextPC (32 b), Found_Jumper (1 b), Inst_Counter (5 b) |
| Body-Size-Range to M Table | 0-10→ 16, 11-20→ 8, 21-30→ 4, 31-40→ 2; index: Mispred_Code: 4 (6 b) entries (3B) |

In one embodiment, a diverge-merge processor (DMP) relies on changes to the compiler, ISA, and micro-architecture to perform selective predication only on those branch instances that have low prediction confidence. Certain embodiments of ACB's dynamic learning and confidence development makes it possible for it to achieve overall gains which are significantly higher than DMP, e.g., by utilizing ACB's criticality-centric approach to dynamically cost-sensitive solutions like predication.

In one embodiment, wish branches rely on the compiler to supply predicated code but applies predication dynamically only on less predictable instances.

Certain embodiments herein of ACB fully comprehend the delicate performance trade-offs created by disabling speculation causing performance inversions in certain scenarios. Additionally, certain embodiments of ACB do not require extensive changes in both hardware (micro-architecture) and software (compiler and ISA), making their implementation less complex and less challenging. In certain embodiments, ACB is a pure hardware solution without any compiler or ISA support. Through a combination of smart selection of critical branches and run-time throttling (dynamo), certain embodiments of ACB deliver significant performance while ensuring its application does not adversely affect other branches.

In certain embodiments, a processor performs a selective flush on a mis-speculation wherein only the control dependent instructions are flushed and re-executed. In contrast with ACB, those processors require complex hardware to remove, re-fetch and re-allocate the selectively flushed instructions, along with complicated methods to correct data dependencies post pipeline flush. One embodiment to simplify this approach is by targeting only converging conditional branches and smarter reservation of OOO resources so that their flush and following re-allocation is simpler. However, this may be limited in application only to branches with consistently behaving branch-body. Moreover, it may also require complex RAT recovery for data consistency. In contrast, certain embodiments of ACB are easier to implement the micro-architecture and utilize a RAT 712 and other OOO circuit 704 components without involving complex changes.

In one embodiment, control flow decoupling (CFD) modifies the targeted branches by separating the control-dependent and control-independent branch body using the compiler. Hardware then does an early resolution of the control flow removing the need for branch prediction. Unlike ACB, CFD depends on both software and hardware support. In one embodiment, a hardware mechanism is used to detect generic re-convergence points of control flow. Unlike ACB's convergence detection, these require large complex hardware resources for implementation.

In this disclosure, certain embodiments of ACB are a lightweight mechanism that is completely implementable in hardware to intelligently disables speculation for only select critical branches, thereby mitigating some of the costly pipeline flushes because of wrong speculation. In certain embodiments, ACB uses a combination of program criticality directed selection of hard to predict branches and a runtime monitoring of performance to overcome the undesirable side-effects of disabling speculation. Micro-architecture solutions invented for ACB, like convergence detection and dynamic performance monitor, can also have far reaching effects on future micro-architecture research. In certain embodiments, ACB provides a unique power-performance feature that delivers a performance gain while also reducing power. It should be understood that ACB may be scaled for future OOO processors and continue to deliver high performance at lower power.

Figure 8:
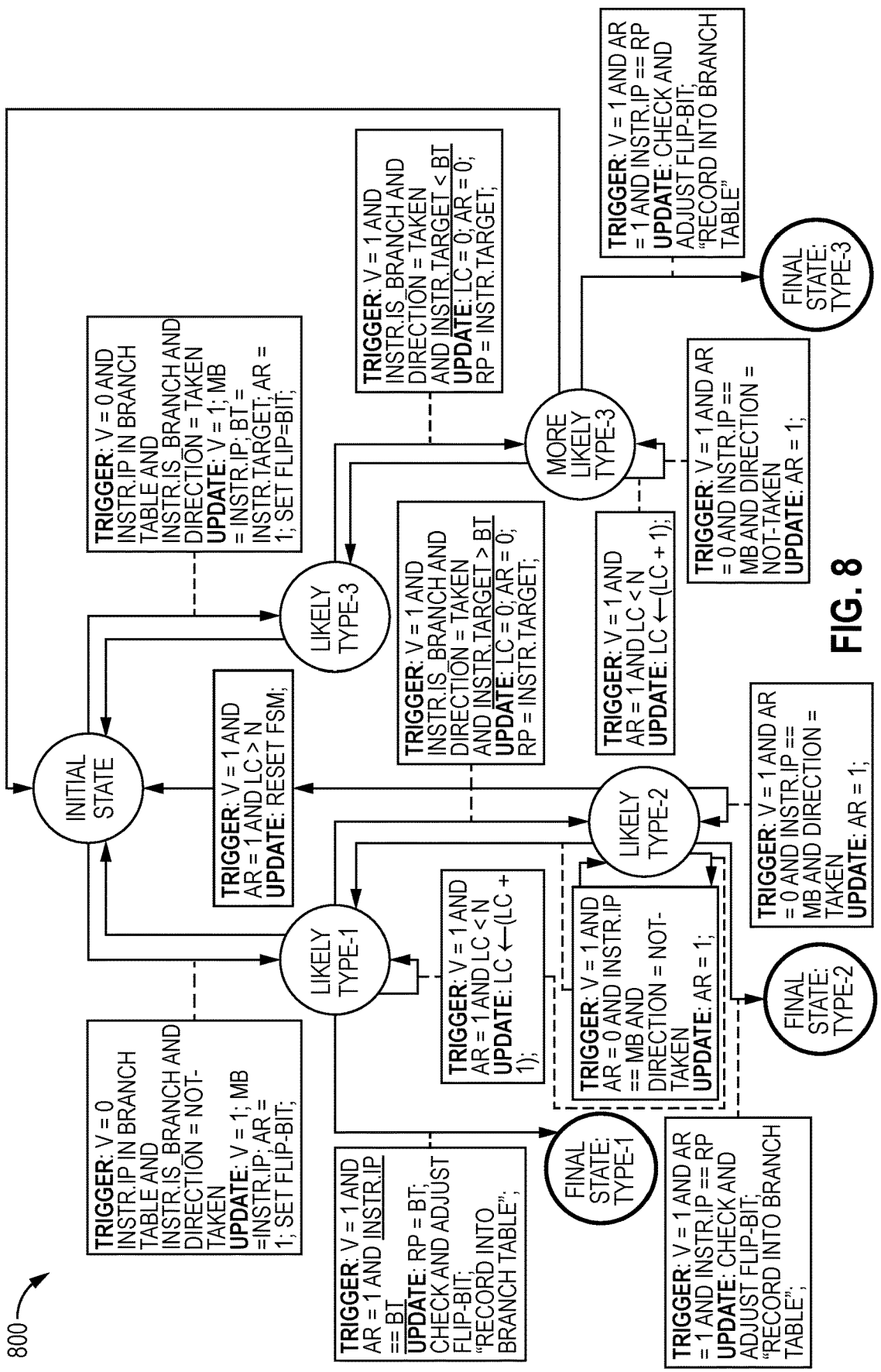
FIG. 8 illustrates a finite state machine (FSM) of a convergence detector according to embodiments of the disclosure.

FIG. 8 illustrates a finite state machine (FSM) 800 of a convergence detector according to embodiments of the disclosure.

In certain embodiments, the hardware area of a processor used to implement an FSM is for modeling the FSM states and the transition tables for the FSM. In certain embodiments (as mentioned above), a set of branch IPs are stored in a tabular form given to the FSM as input. In certain embodiments, one or a plurality of registers are used to store the FSM state information and intermediate flags and values learned by the FSM. In one embodiment, these include:

V—One valid bit denoting whether we are currently learning convergence for some main branch IP.
S—Current State in which the FSM has reached until now.
MB—One address-wide register storing the main branch IP that is being learned.
MBT—One address-wide register storing the target IP of the main branch.
AR—One active recording bit denoting whether we are currently monitoring the IPs being allocated on either path.
RP—One address-wide register to store the intermediate re-convergence point identified by the algorithm.
LC—One register acting as a lookup counter to limit the detection of re-convergence point within n instructions from the main branch.
F—One bit to denote whether main branch being learned is forward-going or backward-going branch.
FSM:

In one embodiment, the FSM 800 is updated during every allocation of a new instruction in the Out-of-Order (OOO) circuit (e.g., circuit 704 in FIG. 7) (e.g., an essential pipeline stage in modern processors). This stage is chosen as the allocation happens in-order and allows for linearly tracking of the sequence of IPs that the program execution and fetching is providing for analysis.

As an example: on every new instruction that is allocated, check V. If V is unset and the new instruction matches any IP in the branch table (e.g., of IPs on interest), then copy this IP into MB and its branch-target into MBT. Also, set the flip-bit by comparing the MP IP with BT and interchanging them while recording (e.g., as mentioned above to handle backward branches).

If V is set, then refer to the FSM and update its state-variables. The state variables are updated by referring to the state-transition table. It takes the current instruction IP, its type, its target (e.g., if it's a branch) and its branch-direction information as coming from the branch prediction unit (BPU) as the inputs to make transitions. It also takes its own state variables as other inputs.

An example of all the states, the state-transition triggers for each state (e.g., depicted as circle in FIG. 8), and the state-variable updates happening as a result of each state-transition are illustrated in FIG. 8.

In one embodiment, when reaching any of the three final Type-confirming states, then copy the detected Type information (e.g., if needed by any performance feature) and the detected re-convergence point into the entry corresponding to this MB candidate in the branch table. Also refer to F (the flip-bit) to decide whether to interchange the final detected type. Finally, reset all the FSM state variables including the valid bit, V.

Since FSM update is happening upon OOO allocation which itself can lie on the speculative path and might get cleared due to some older misprediction injected pipeline clear, making the FSM-learning invalid, it may be desired to completely reset the FSM state upon detecting any such pipeline clear signal which affects OOO allocation.

FIG. 8 provides a description of the Finite State Machine (FSM) model used by an embodiment of a Dynamic Convergence Detection system.

Figure 9:
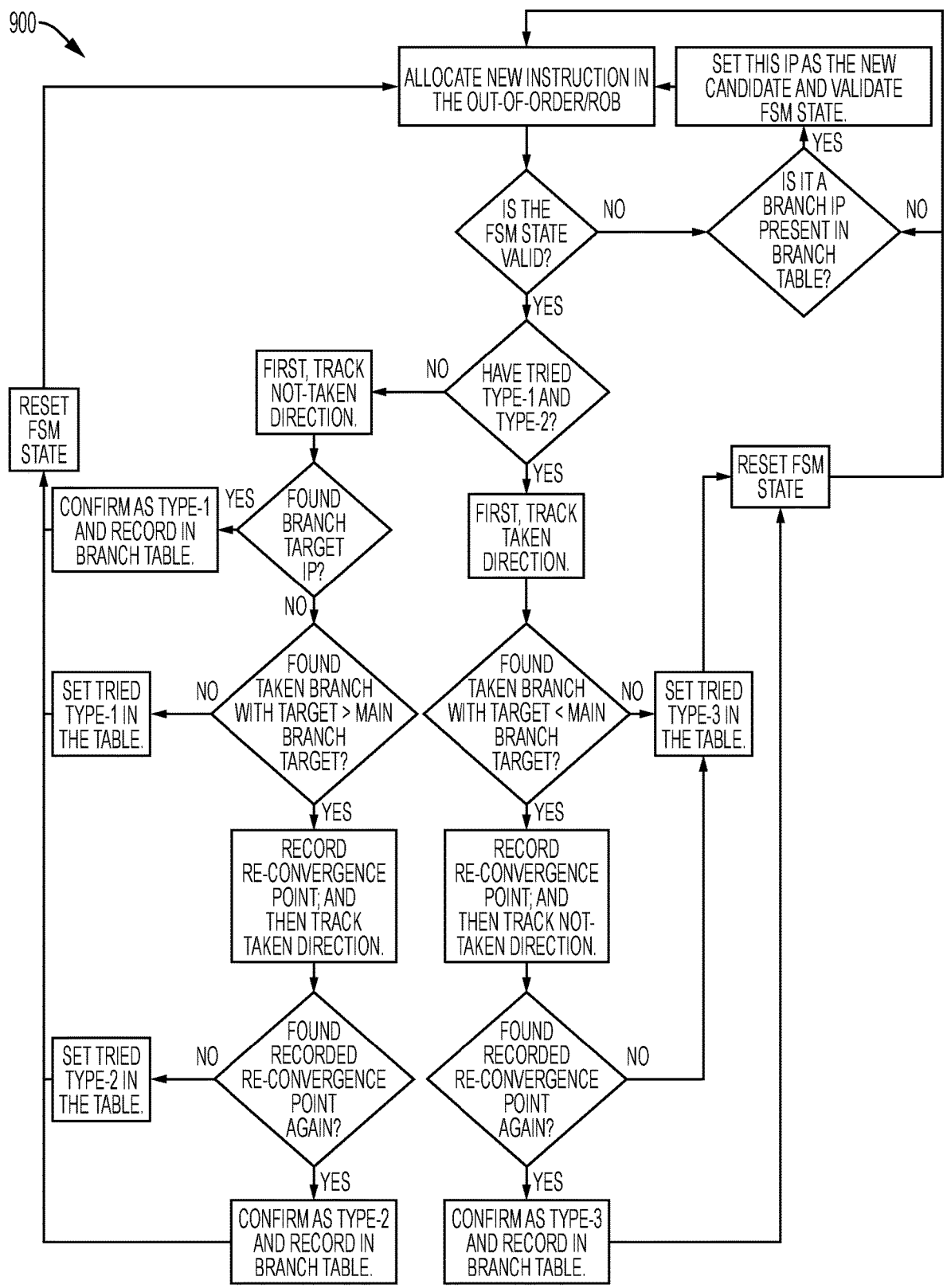
FIG. 9 illustrates a flow diagram for designing an FSM model according to embodiments of the disclosure.

FIG. 9 illustrates a flow diagram 900 for designing an FSM model according to embodiments of the disclosure.

A summary of the FSM design is also represented in FIG. 9 (with respect to convergence in forward-going branches for simplicity; backward-going branches are handled similarly with minor differences as mentioned above) which inspired the design of the above FSM in FIG. 8. This may be summarized as follows.

For any branch whose convergence is to be detected and learned, is first assumed to be Type-1. Wait first for the Not-Taken direction fetching instance of the branch. If the branch target is being allocated within n instructions allocated after the branch, then qualify it as Type-1.

If instead of seeing the branch target, a branch goes in the Taken direction with a target higher than the branch target, then qualify it as being likely of Type-2 and record this target as the potential re-convergence point.

Next, wait for the Taken direction fetching instance to occur, after which if the recorded re-convergence point appears within n instructions after the branch, then confirm it as Type-2.

If it remains unconfirmed as both Type-1 and Type-2 after the above learning sequence, next it is attempted to confirm it as Type-3. In one embodiment, this requires first waiting for the Taken direction fetching instance of the branch. If it is found that a branch directing the control flow through its Taken direction is to a target lower than the branch target, then qualify it as being likely of Type-2 and record this target as the potential re-convergence point.

Next, wait for the Not-Taken direction fetching instance to occur, after which if it is found again that the recorded re-convergence point appears within n instructions after the branch, then confirm it as Type-3.

In any state, while tracking the allocated IPs on either path (e.g., AR bit is set), the instruction counter (LC) is exhausted beyond n, then immediately reset the FSM state (e.g., signifying a failure in asserting convergence of control flow) and wait for the next candidate branch which can be learned.

FIG. 9 is a flow chart diagram 900 summarizing an embodiment of an approach to design an FSM model.

Figure 10:
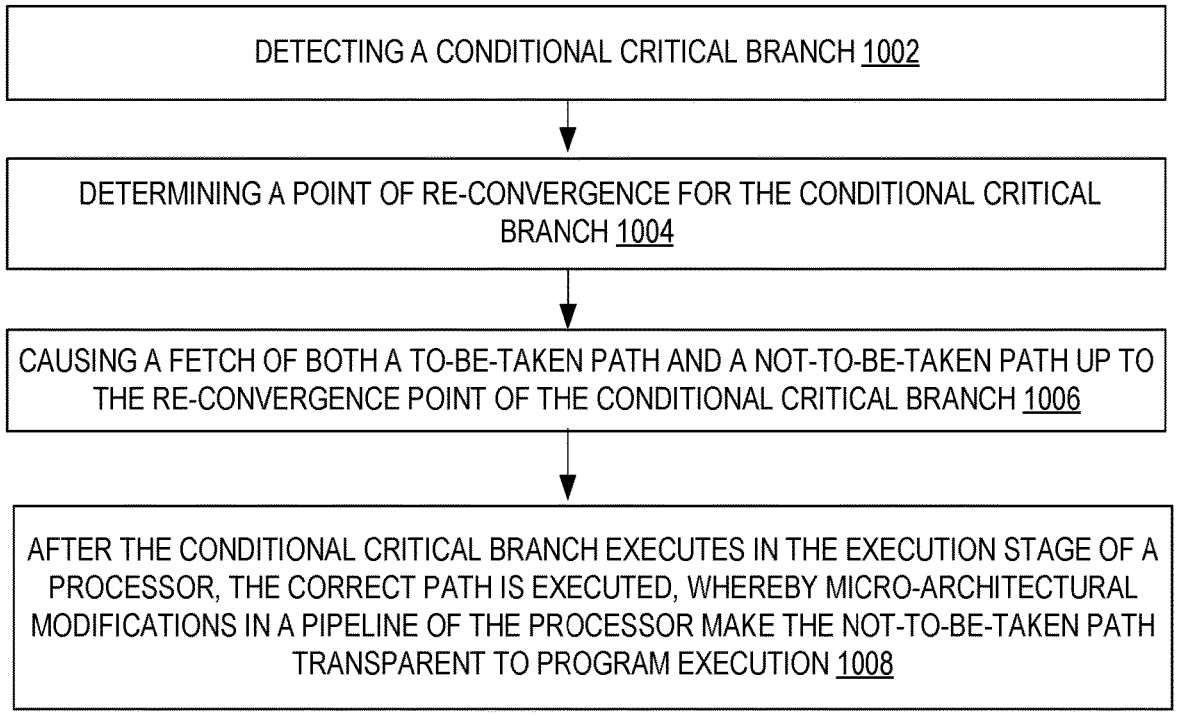
FIG. 10 illustrates a flow diagram according to embodiments of the disclosure.

FIG. 10 illustrates a flow diagram 1000 according to embodiments of the disclosure. Depicted flow 1000 includes detecting a conditional critical branch 1002, determining a point of re-convergence for the conditional critical branch 1004, causing a fetch of both a to-be-taken path and a not-to-be-taken path up to the re-convergence point of the conditional critical branch 1006, and, after the conditional critical branch executes in the execution stage of a processor, the correct path is executed, whereby micro-architectural modifications in a pipeline of the processor make the not-to-be-taken path transparent to program execution 1008.

Exemplary architectures, systems, etc. that the above may be used in are detailed below.

At least some embodiments of the disclosed technologies can be described in view of the following examples:

Example 1. A processor core comprising:
a decoder to decode instructions into decoded instructions;
an execution unit to execute the decoded instructions;
a branch predictor circuit to predict future outcomes of branch instructions; and
a branch predication manager circuit to disable use of a predicted future outcome of a critical branch of the branch instructions.

Example 2. The processor core of example 1, wherein the branch predication manager circuit detects a conditional critical branch of the branch instructions, and then determines a point of re-convergence for the conditional critical branch.

Example 3. The processor core of example 2, further comprising an instruction fetch unit, and the branch predication manager circuit causes the instruction fetch unit to fetch instructions of both a taken portion and a not-taken portion of the conditional critical branch up to the point of re-convergence.

Example 4. A processor core comprising:
a decoder to decode instructions into decoded instructions;
an execution unit to execute the decoded instructions;
a branch predictor circuit to predict a future outcome of a branch instruction; and
a branch predication manager circuit to disable use of the predicted future outcome for a conditional critical branch comprising the branch instruction.

Example 5. The processor core of example 4, wherein the branch predication manager circuit is to detect the conditional critical branch, and then determine a point of re-convergence for the conditional critical branch.

Example 6. The processor core of example 5, further comprising an instruction fetch unit, and the branch predication manager circuit causes the instruction fetch unit to fetch instructions of both a taken portion and a not-taken portion of the conditional critical branch up to the point of re-convergence.

Example 7. The processor core of example 6, wherein the branch predication manager circuit is to cause the taken portion of the conditional critical branch to be architecturally visible after detecting the branch instruction of the conditional critical branch is executed by the execution unit.

Example 8. The processor core of example 6, wherein the branch predication manager circuit is to increment a counter for every mispredicted instance of the branch instruction that triggers a pipeline flush, and disable use of the predicted future outcome for the conditional critical branch comprising the branch instruction when the counter exceeds a threshold.

Example 9. The processor core of example 6, wherein the branch predication manager circuit is to determine if the conditional critical branch is one of a plurality of possible convergence patterns, and cause the instruction fetch unit to fetch the instructions of both the taken portion and the not-taken portion of the conditional critical branch up to the point of re-convergence in response to the conditional critical branch being one of the plurality of possible convergence patterns.

Example 10. The processor core of example 4, wherein the branch predication manager circuit is to determine that a conditional branch is the critical conditional branch when the conditional branch exceeds a minimum threshold of misprediction events in an observation window of retired instructions.

Example 11. The processor core of example 4, wherein the branch predication manager circuit is to throttle disabling of the use of the predicted future outcome based at least in part on a comparison of performance (e.g., a respective number of cycles) for a first proper subset of a plurality of retired instances of the conditional critical branch where the branch predication manager circuit is allowed to disable use of the predicted future outcome and performance for a second proper subset of the plurality of retired instances of the conditional critical branch where the branch predication manager circuit is not allowed to disable use of the predicted future outcome.

Example 12. A method comprising:
decoding instructions into decoded instructions with a decoder of a hardware processor;
executing the decoded instructions with an execution unit of the hardware processor;
predicting a future outcome of a branch instruction with a branch predictor circuit of the hardware processor; and
disabling use of the predicted future outcome for a conditional critical branch comprising the branch instruction with a branch predication manager circuit of the hardware processor.

Example 13. The method of example 12, further comprising detecting the conditional critical branch with the branch predication manager circuit, and then determining a point of re-convergence for the conditional critical branch with the branch predication manager circuit.

Example 14. The method of example 13, further comprising causing, by the branch predication manager circuit, an instruction fetch unit of the hardware processor to fetch instructions of both a taken portion and a not-taken portion of the conditional critical branch up to the point of re-convergence.

Example 15. The method of example 14, further comprising causing, by the branch predication manager circuit, the taken portion of the conditional critical branch to be architecturally visible after detecting the branch instruction of the conditional critical branch is executed by the execution unit.

Example 16. The method of example 14, further comprising:
incrementing a counter for every mispredicted instance of the branch instruction that triggers a pipeline flush; and
disabling use of the predicted future outcome for the conditional critical branch comprising the branch instruction when the counter exceeds a threshold.

Example 17. The method of example 14, further comprising:
determining, by the branch predication manager circuit, if the conditional critical branch is one of a plurality of possible convergence patterns, and
causing the instruction fetch unit to fetch the instructions of both the taken portion and the not-taken portion of the conditional critical branch up to the point of re-convergence in response to the conditional critical branch being one of the plurality of possible convergence patterns.

Example 18. The method of example 12, further comprising determining, by the branch predication manager circuit, that a conditional branch is the critical conditional branch when the conditional branch exceeds a minimum threshold of misprediction events in an observation window of retired instructions.

Example 19. The method of example 12, further comprising throttling disabling of the use of the predicted future outcome, by the branch predication manager circuit, based at least in part on a comparison of performance for a first proper subset of a plurality of retired instances of the conditional critical branch where the branch predication manager circuit is allowed to disable use of the predicted future outcome and performance for a second proper subset of the plurality of retired instances of the conditional critical branch where the branch predication manager circuit is not allowed to disable use of the predicted future outcome.

Example 20. A non-transitory machine readable medium that stores program code that when executed by a machine causes the machine to perform a method comprising:
decoding instructions into decoded instructions with a decoder of a hardware processor;
executing the decoded instructions with an execution unit of the hardware processor;
predicting a future outcome of a branch instruction with a branch predictor circuit of the hardware processor; and
disabling use of the predicted future outcome for a conditional critical branch comprising the branch instruction with a branch predication manager circuit of the hardware processor.

Example 21. The non-transitory machine readable medium of example 20, further comprising detecting the conditional critical branch with the branch predication manager circuit, and then determining a point of re-convergence for the conditional critical branch with the branch predication manager circuit.

Example 22. The non-transitory machine readable medium of example 21, further comprising causing, by the branch predication manager circuit, an instruction fetch unit of the hardware processor to fetch instructions of both a taken portion and a not-taken portion of the conditional critical branch up to the point of re-convergence.

Example 23. The non-transitory machine readable medium of example 22, further comprising causing, by the branch predication manager circuit, the taken portion of the conditional critical branch to be architecturally visible after detecting the branch instruction of the conditional critical branch is executed by the execution unit.

Example 24. The non-transitory machine readable medium of example 22, further comprising:
incrementing a counter for every mispredicted instance of the branch instruction that triggers a pipeline flush; and
disabling use of the predicted future outcome for the conditional critical branch comprising the branch instruction when the counter exceeds a threshold.

Example 25. The non-transitory machine readable medium of example 22, further comprising:
determining, by the branch predication manager circuit, if the conditional critical branch is one of a plurality of possible convergence patterns, and
causing the instruction fetch unit to fetch the instructions of both the taken portion and the not-taken portion of the conditional critical branch up to the point of re-convergence in response to the conditional critical branch being one of the plurality of possible convergence patterns.

Example 26. The non-transitory machine readable medium of example 20, further comprising determining, by the branch predication manager circuit, that a conditional branch is the critical conditional branch when the conditional branch exceeds a minimum threshold of misprediction events in an observation window of retired instructions.

Example 27. The non-transitory machine readable medium of example 20, further comprising throttling disabling of the use of the predicted future outcome, by the branch predication manager circuit, based at least in part on a comparison of performance for a first proper subset of a plurality of retired instances of the conditional critical branch where the branch predication manager circuit is allowed to disable use of the predicted future outcome and performance for a second proper subset of the plurality of retired instances of the conditional critical branch where the branch predication manager circuit is not allowed to disable use of the predicted future outcome.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
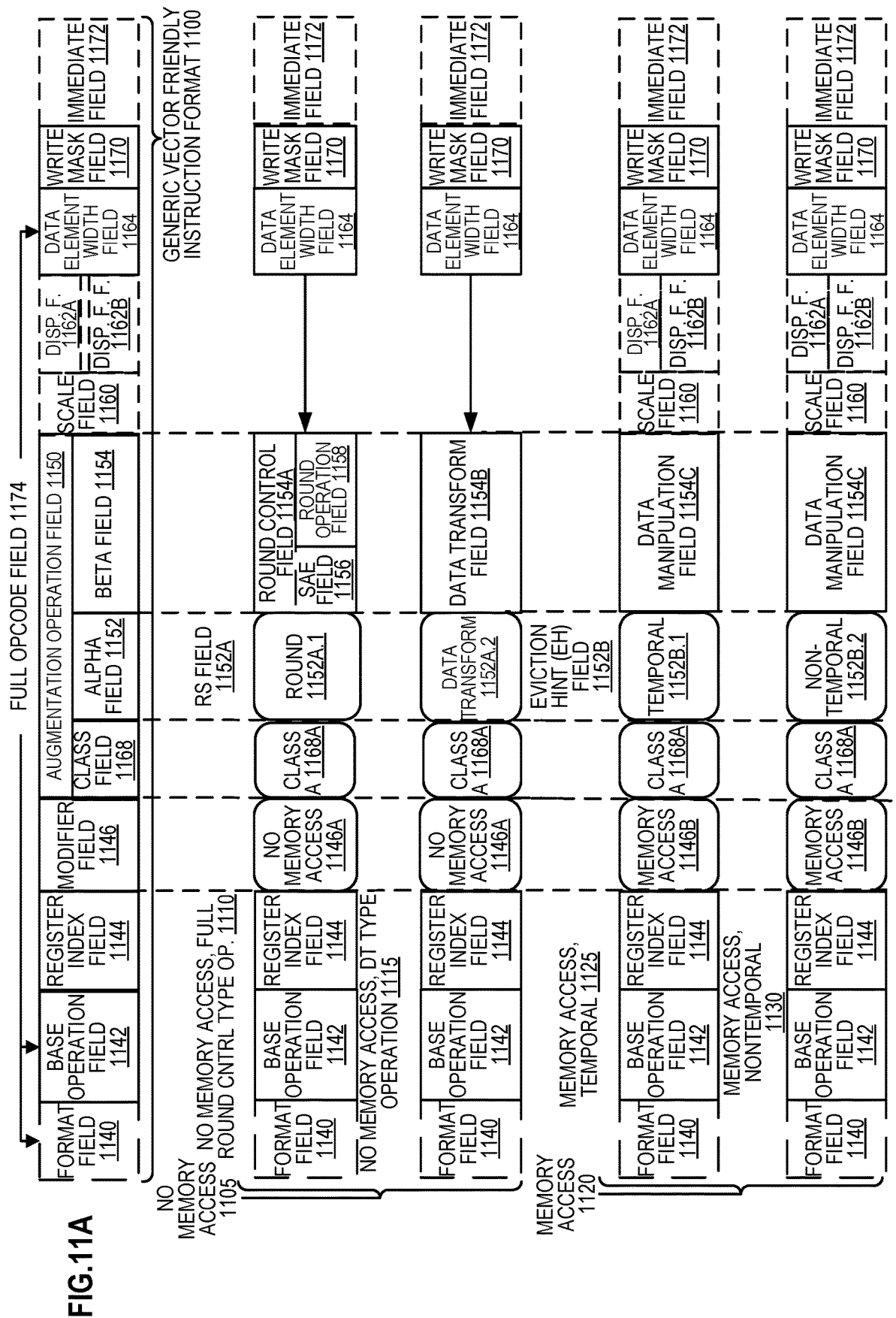
FIG. 11A is a block diagram illustrating a generic vector friendly instruction format and class A instruction templates thereof according to embodiments of the disclosure.
Figure 11B:
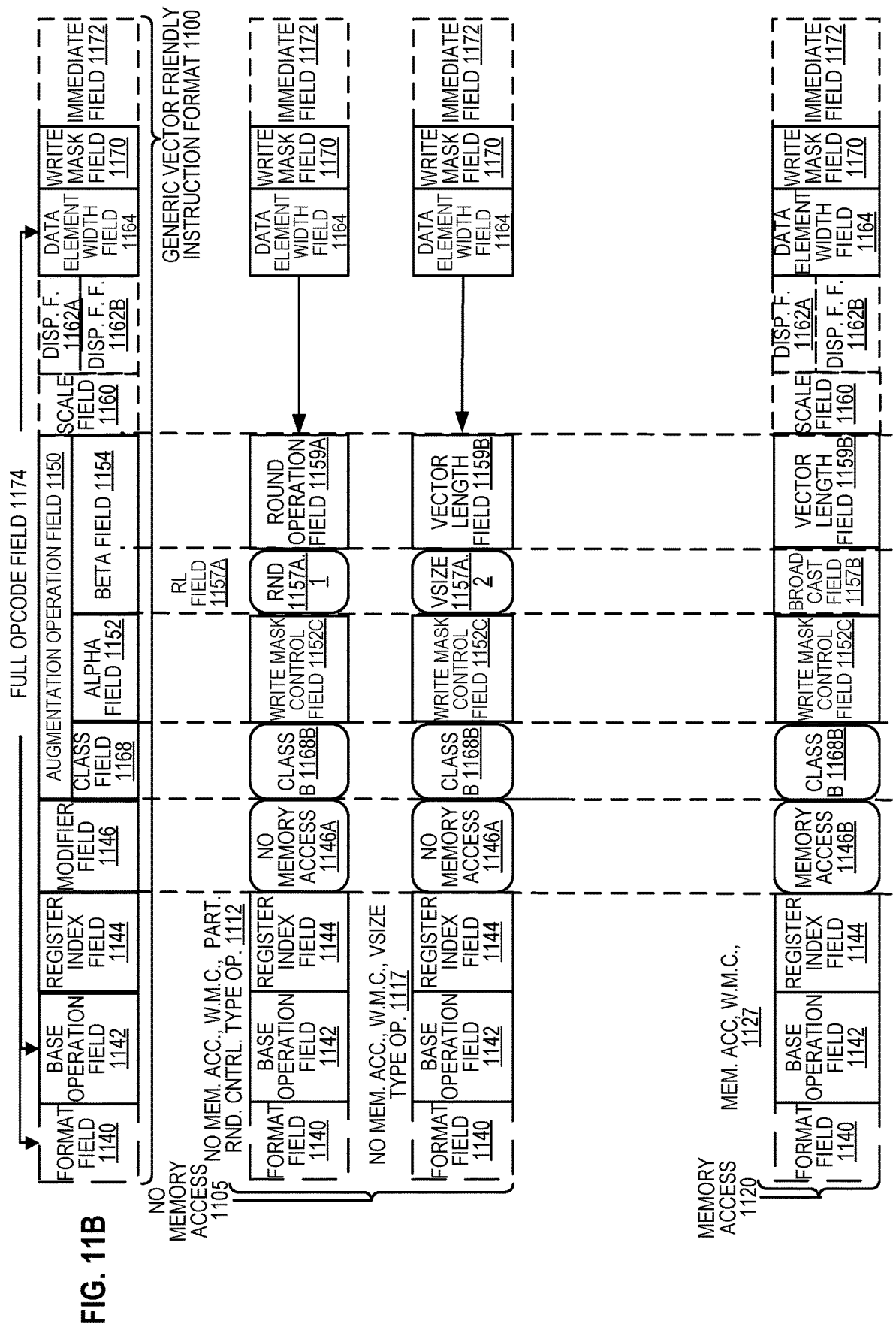
FIG. 11B is a block diagram illustrating the generic vector friendly instruction format and class B instruction templates thereof according to embodiments of the disclosure.

FIGS. 11A-11B are block diagrams illustrating a generic vector friendly instruction format and instruction templates thereof according to embodiments of the disclosure. FIG. 11A is a block diagram illustrating a generic vector friendly instruction format and class A instruction templates thereof according to embodiments of the disclosure; while FIG. 11B is a block diagram illustrating the generic vector friendly instruction format and class B instruction templates thereof according to embodiments of the disclosure. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the disclosure, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}$*index+base).

Displacement Field 1162A—its content is used as part of memory address generation (e.g., for address generation that uses $2^{scale}$*index+base+displacement).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the disclosure are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the disclosure the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the disclosure where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the disclosure where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the disclosure. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the disclosure are described with reference to the specific vector friendly instruction format 1200 in the context of the generic vector friendly instruction format 1100 for illustrative purposes, the disclosure is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the disclosure is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]-X), and 1157BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.0=0, it indicates class A or EVEX.U0; if EVEX.0=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the disclosure. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the disclosure. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
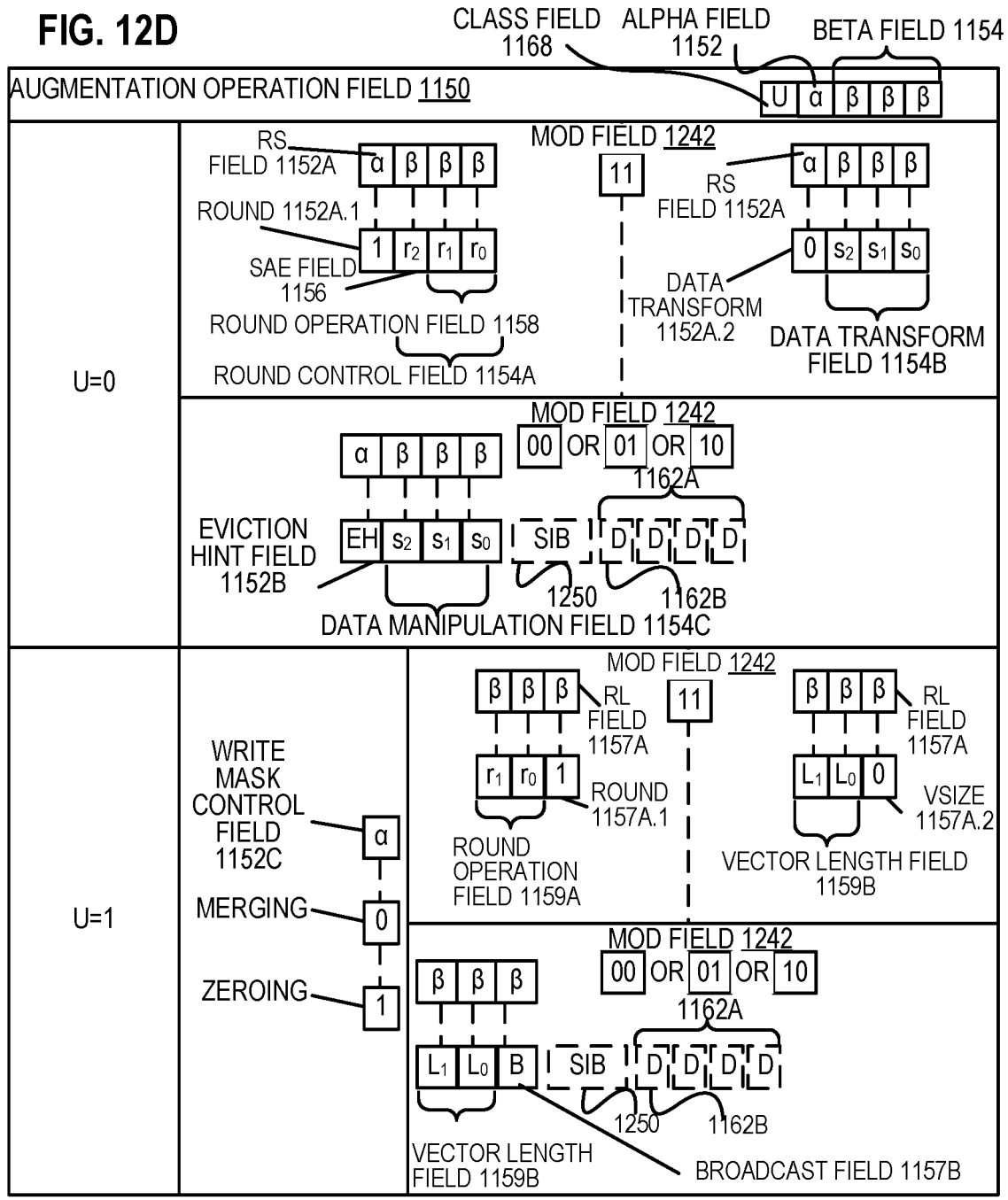
FIG. 12D is a block diagram illustrating the fields of the specific vector friendly instruction format in FIG. 12A that make up the augmentation operation field 1150 according to one embodiment of the disclosure.

FIG. 12D is a block diagram illustrating the fields of the specific vector friendly instruction format 1200 that make up the augmentation operation field 1150 according to one embodiment of the disclosure. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
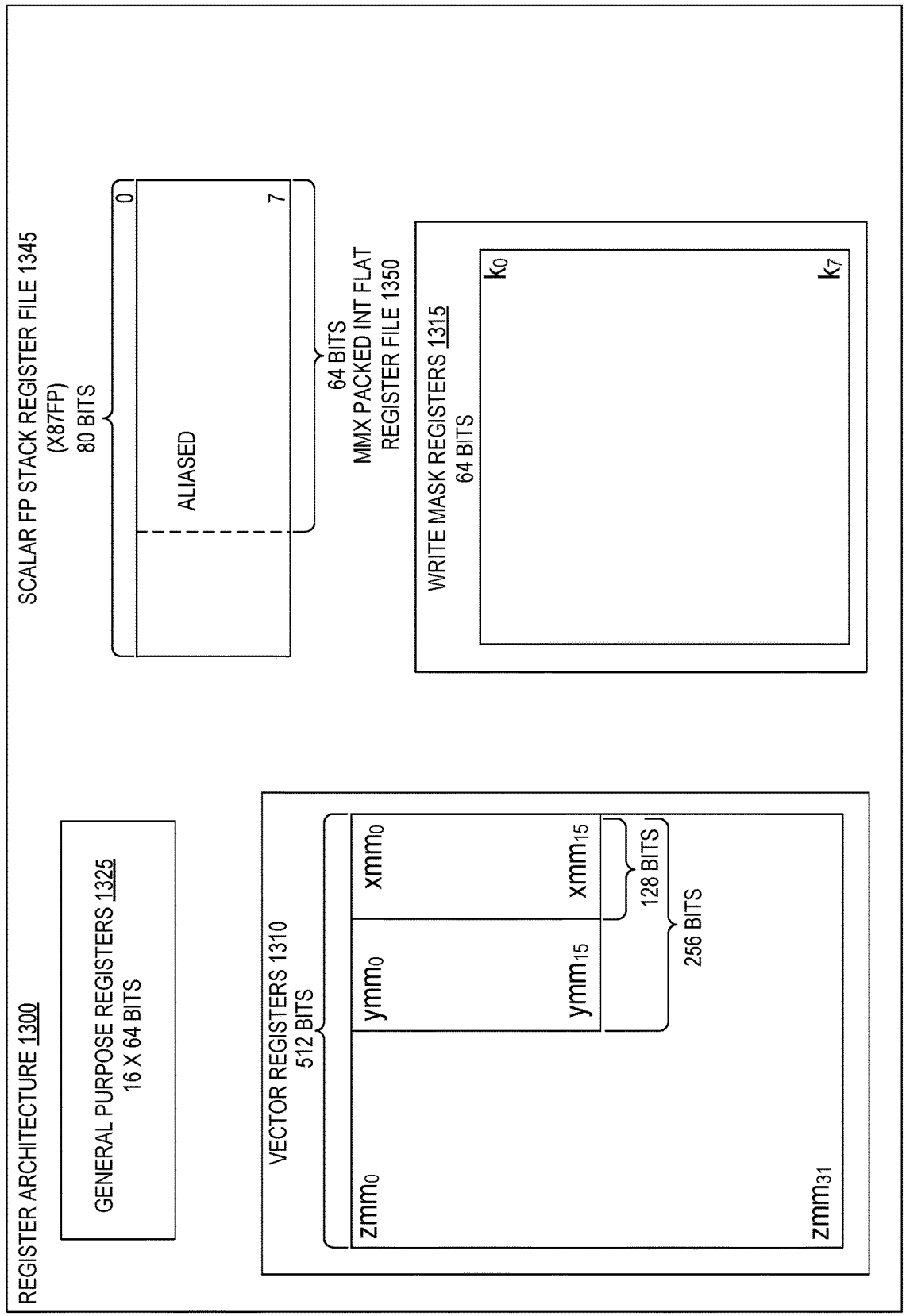
FIG. 13 is a block diagram of a register architecture according to one embodiment of the disclosure

FIG. 13 is a block diagram of a register architecture 1300 according to one embodiment of the disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
| --- | --- | --- | --- |
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the disclosure. FIG. 14B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macro-instructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 (e.g., execution circuits) and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
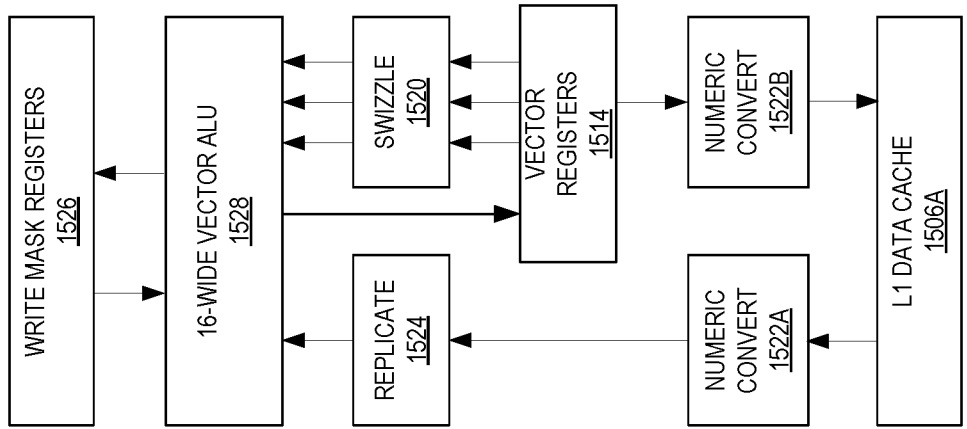
FIG. 15B is an expanded view of part of the processor core in FIG. 15A according to embodiments of the disclosure.
Figure 15A:
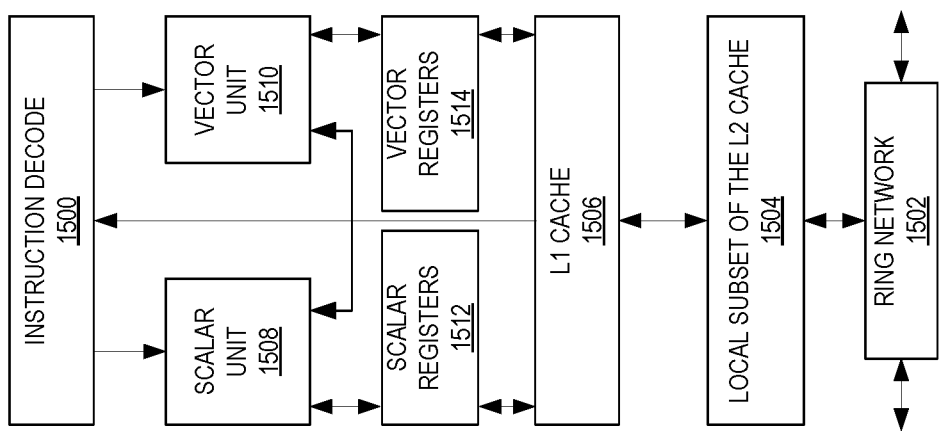
FIG. 15A is a block diagram of a single processor core, along with its connection to the on-die interconnect network and with its local subset of the Level 2 (L2) cache, according to embodiments of the disclosure.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the disclosure. In one embodiment, an instruction decode unit 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the disclosure may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the disclosure. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
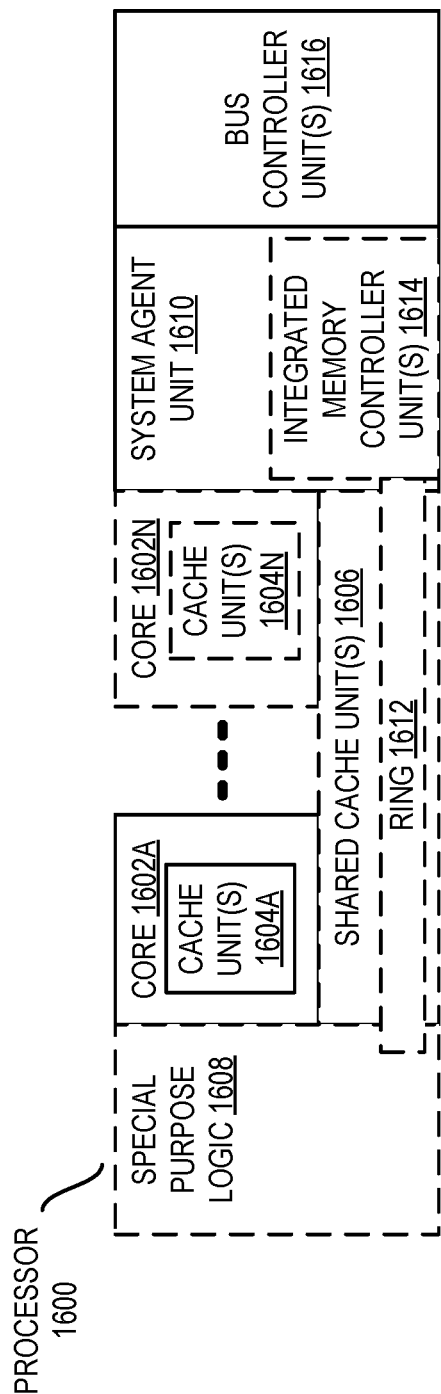
FIG. 16 is a block diagram of a processor that may have more than one core, may have an integrated memory controller, and may have integrated graphics according to embodiments of the disclosure.

FIG. 16 is a block diagram of a processor 1600 that may have more than one core, may have an integrated memory controller, and may have integrated graphics according to embodiments of the disclosure. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
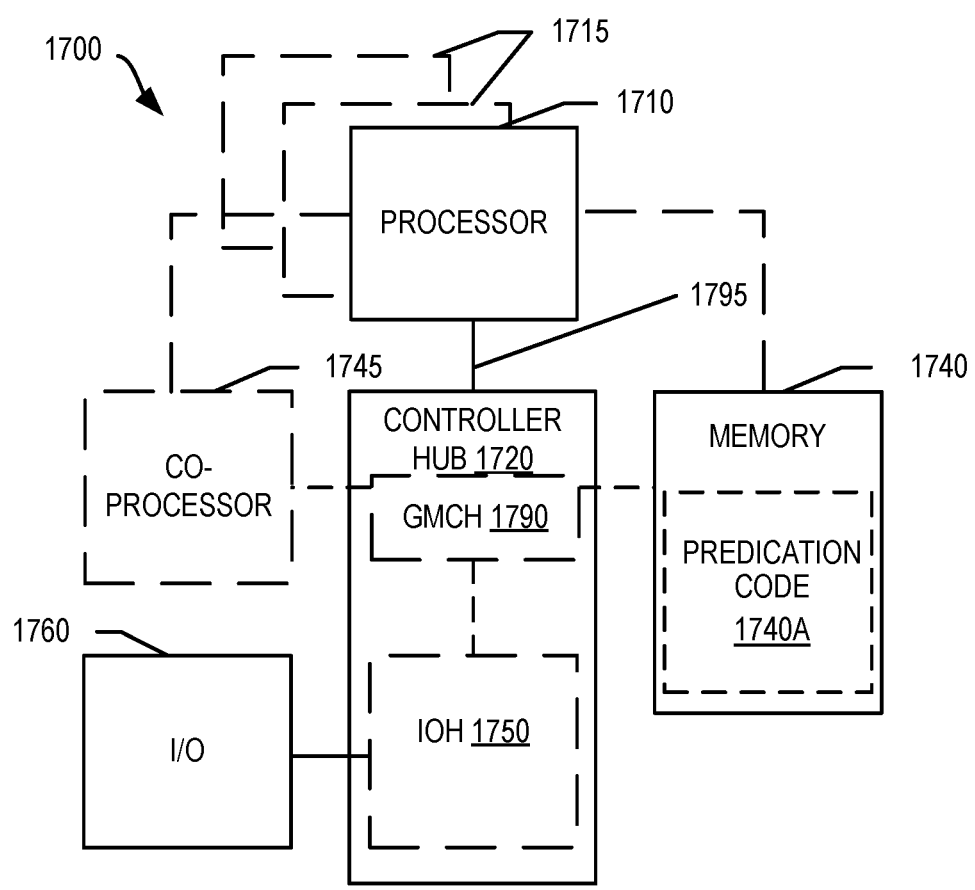
FIG. 17 is a block diagram of a system in accordance with one embodiment of the present disclosure.

Referring now to FIG. 17, shown is a block diagram of a system 1700 in accordance with one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750. Memory 1740 may include a predication code 1740A, for example, to store code that when executed causes a processor to perform any method of this disclosure.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quickpath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
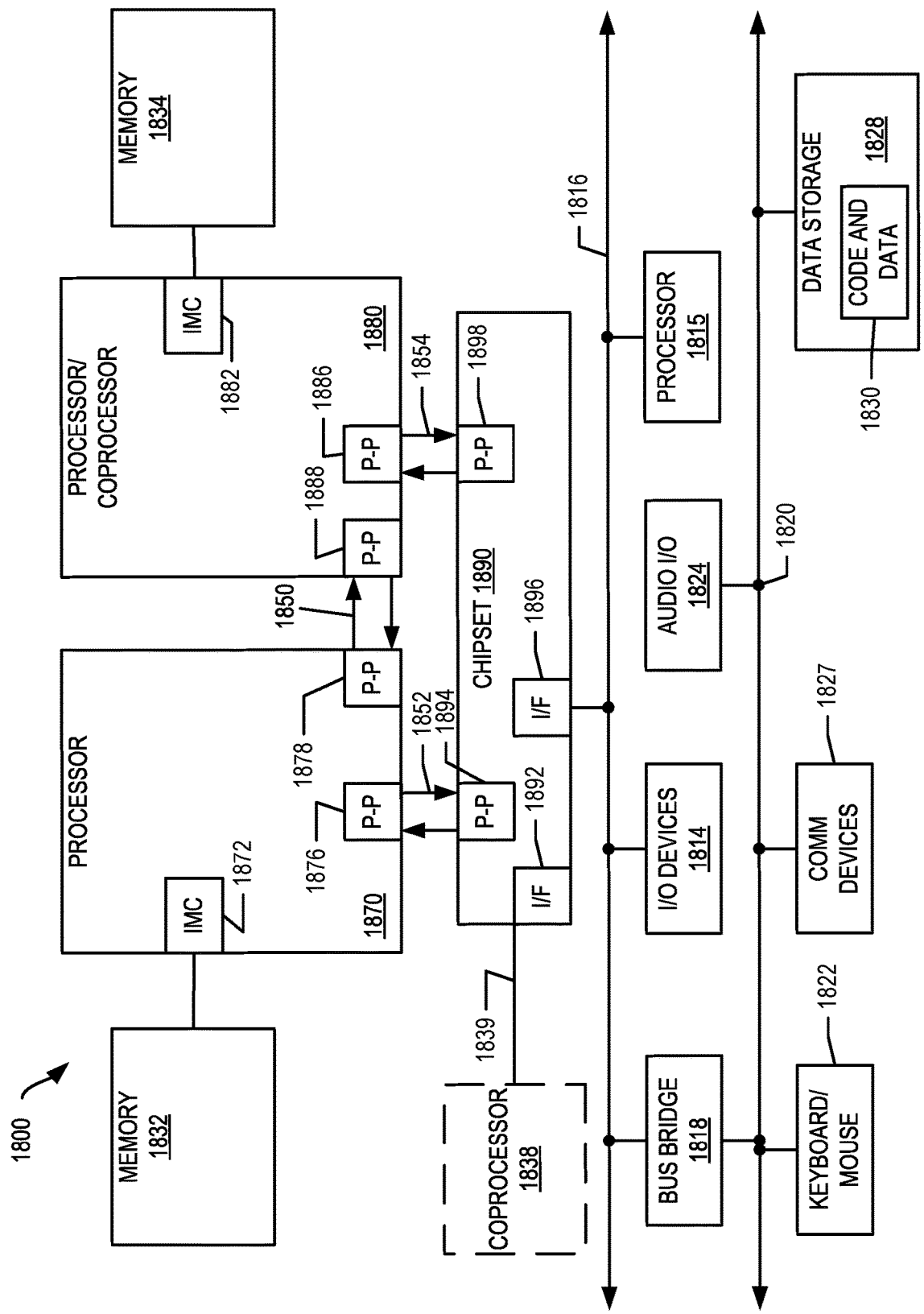
FIG. 18 is a block diagram of a more specific exemplary system in accordance with an embodiment of the present disclosure.

Referring now to FIG. 18, shown is a block diagram of a first more specific exemplary system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the disclosure, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
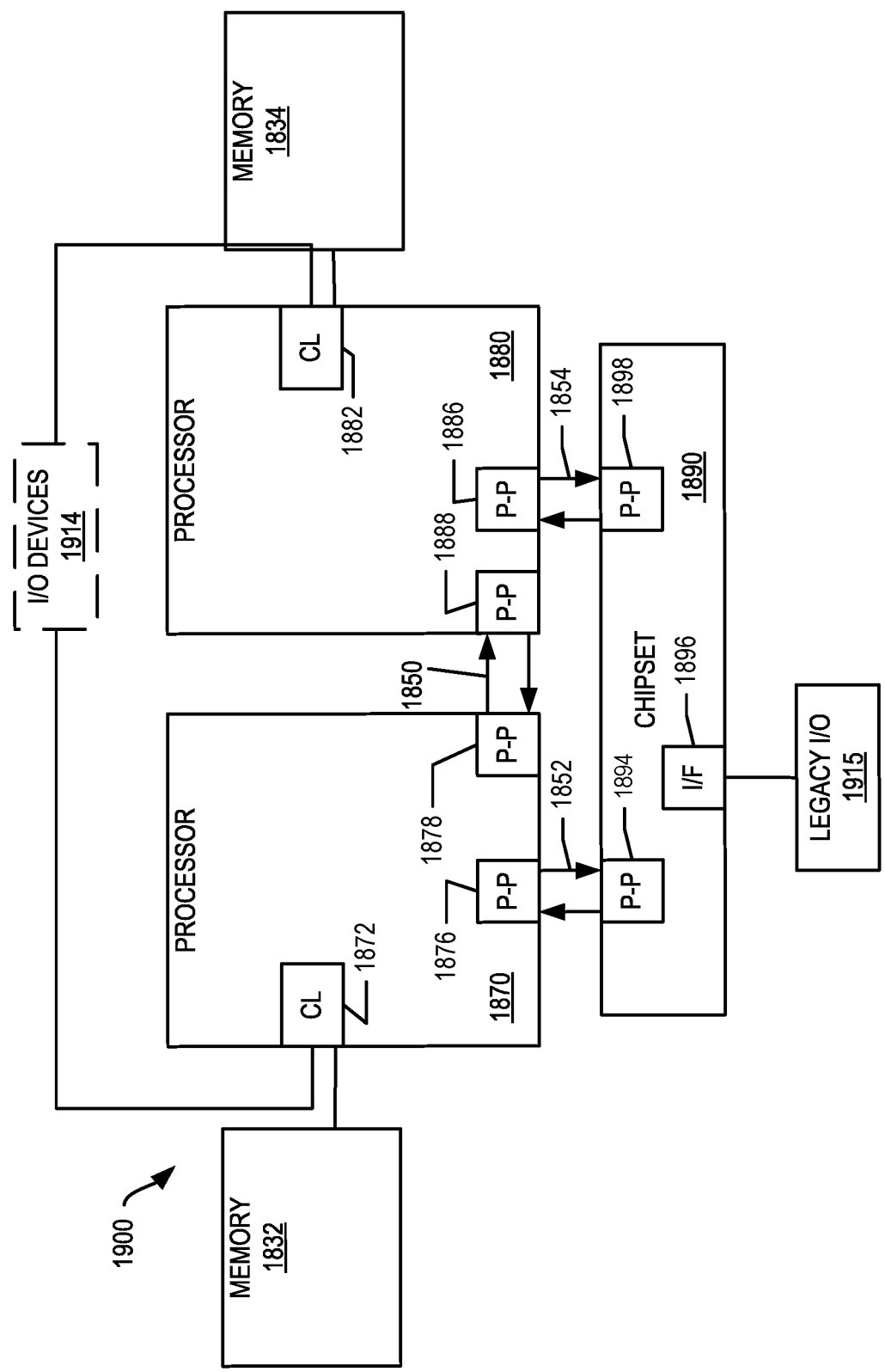
FIG. 19, shown is a block diagram of a second more specific exemplary system in accordance with an embodiment of the present disclosure.

Referring now to FIG. 19, shown is a block diagram of a second more specific exemplary system 1900 in accordance with an embodiment of the present disclosure Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
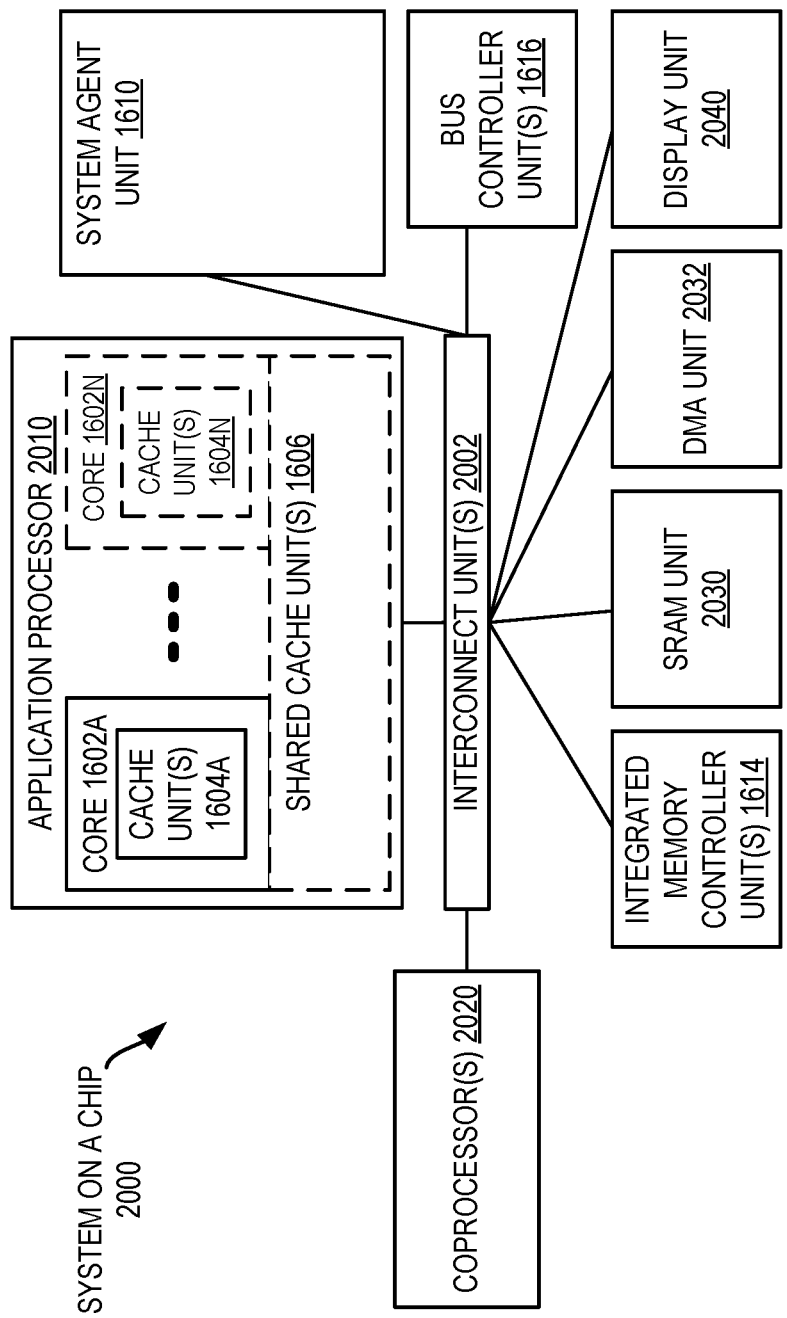
FIG. 20, shown is a block diagram of a system on a chip (SoC) in accordance with an embodiment of the present disclosure.

Referring now to FIG. 20, shown is a block diagram of a SoC 2000 in accordance with an embodiment of the present disclosure. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
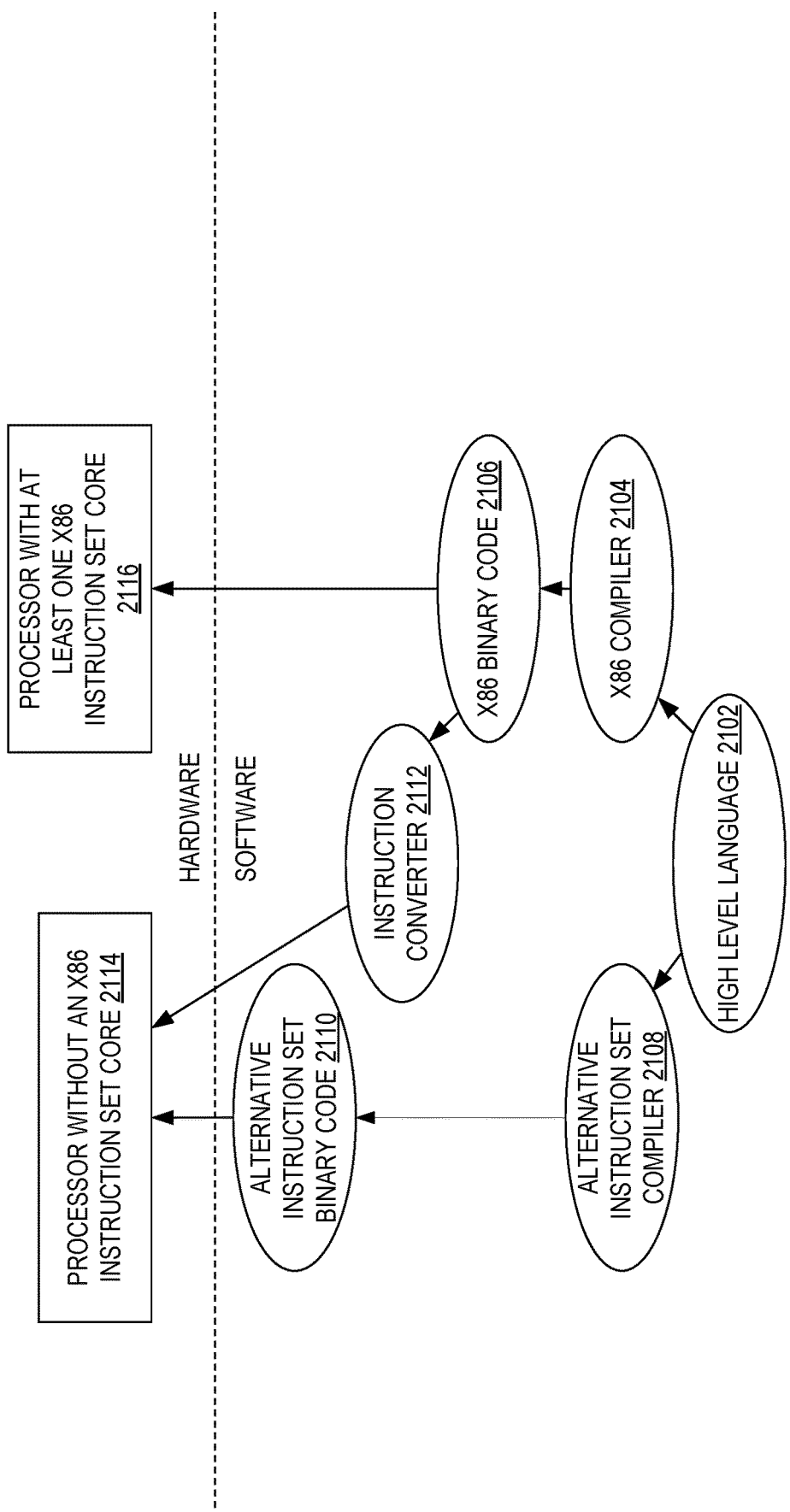
FIG. 21 is a block diagram contrasting the use of a software instruction converter to convert binary instructions in a source instruction set to binary instructions in a target instruction set according to embodiments of the disclosure.

FIG. 21 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

What is claimed is:

1. A processor core comprising:
a decoder to decode instructions into decoded instructions;
an execution unit to execute the decoded instructions;
a branch predictor circuit to predict a future outcome of a branch instruction; and
a branch predication manager circuit to disable use of the predicted future outcome, that has been generated by the branch predictor circuit, for a conditional critical branch comprising the branch instruction.

2. The processor core of claim 1, wherein the branch predication manager circuit is to detect the conditional critical branch, and then determine a point of re-convergence for the conditional critical branch.

3. The processor core of claim 2, further comprising an instruction fetch unit, and the branch predication manager circuit causes the instruction fetch unit to fetch instructions of both a taken portion and a not-taken portion of the conditional critical branch up to the point of re-convergence.

4. The processor core of claim 3, wherein the branch predication manager circuit is to cause the taken portion of the conditional critical branch to be architecturally visible after detecting the branch instruction of the conditional critical branch is executed by the execution unit.

5. The processor core of claim 3, wherein the branch predication manager circuit is to increment a counter for every mispredicted instance of the branch instruction that triggers a pipeline flush, and disable use of the predicted future outcome for the conditional critical branch comprising the branch instruction when the counter exceeds a threshold.

6. The processor core of claim 3, wherein the branch predication manager circuit is to determine if the conditional critical branch is one of a plurality of possible convergence patterns, and cause the instruction fetch unit to fetch the instructions of both the taken portion and the not-taken portion of the conditional critical branch up to the point of re-convergence in response to the conditional critical branch being one of the plurality of possible convergence patterns.

7. The processor core of claim 1, wherein the branch predication manager circuit is to determine that a conditional branch is the critical conditional branch when the conditional branch exceeds a minimum threshold of misprediction events in an observation window of retired instructions.

8. The processor core of claim 1, wherein the branch predication manager circuit is to throttle disabling of the use of the predicted future outcome based at least in part on a comparison of performance for a first proper subset of a plurality of retired instances of the conditional critical branch where the branch predication manager circuit is allowed to disable use of the predicted future outcome and performance for a second proper subset of the plurality of retired instances of the conditional critical branch where the branch predication manager circuit is not allowed to disable use of the predicted future outcome.

9. A method comprising:
decoding instructions into decoded instructions with a decoder of a hardware processor;
executing the decoded instructions with an execution unit of the hardware processor;
predicting a future outcome of a branch instruction with a branch predictor circuit of the hardware processor; and
disabling use of the predicted future outcome, that has been generated by the branch predictor circuit, for a conditional critical branch comprising the branch instruction with a branch predication manager circuit of the hardware processor.

10. The method of claim 9, further comprising detecting the conditional critical branch with the branch predication manager circuit, and then determining a point of re-convergence for the conditional critical branch with the branch predication manager circuit.

11. The method of claim 10, further comprising causing, by the branch predication manager circuit, an instruction fetch unit of the hardware processor to fetch instructions of both a taken portion and a not-taken portion of the conditional critical branch up to the point of re-convergence.

12. The method of claim 11, further comprising causing, by the branch predication manager circuit, the taken portion of the conditional critical branch to be architecturally visible after detecting the branch instruction of the conditional critical branch is executed by the execution unit.

13. The method of claim 11, further comprising:
incrementing a counter for every mispredicted instance of the branch instruction that triggers a pipeline flush; and
disabling use of the predicted future outcome for the conditional critical branch comprising the branch instruction when the counter exceeds a threshold.

14. The method of claim 11, further comprising:
determining, by the branch predication manager circuit, if the conditional critical branch is one of a plurality of possible convergence patterns, and
causing the instruction fetch unit to fetch the instructions of both the taken portion and the not-taken portion of the conditional critical branch up to the point of re-convergence in response to the conditional critical branch being one of the plurality of possible convergence patterns.

15. The method of claim 9, further comprising determining, by the branch predication manager circuit, that a conditional branch is the critical conditional branch when the conditional branch exceeds a minimum threshold of misprediction events in an observation window of retired instructions.

16. The method of claim 9, further comprising throttling disabling of the use of the predicted future outcome, by the branch predication manager circuit, based at least in part on a comparison of performance for a first proper subset of a plurality of retired instances of the conditional critical branch where the branch predication manager circuit is allowed to disable use of the predicted future outcome and performance for a second proper subset of the plurality of retired instances of the conditional critical branch where the branch predication manager circuit is not allowed to disable use of the predicted future outcome.

17. A non-transitory machine readable medium that stores program code that when executed by a machine causes the machine to perform a method comprising:
decoding instructions into decoded instructions with a decoder of a hardware processor;
executing the decoded instructions with an execution unit of the hardware processor;
predicting a future outcome of a branch instruction with a branch predictor circuit of the hardware processor; and
disabling use of the predicted future outcome, that has been generated by the branch predictor circuit, for a conditional critical branch comprising the branch instruction with a branch predication manager circuit of the hardware processor.

18. The non-transitory machine readable medium of claim 17, further comprising detecting the conditional critical branch with the branch predication manager circuit, and then determining a point of re-convergence for the conditional critical branch with the branch predication manager circuit.

19. The non-transitory machine readable medium of claim 18, further comprising causing, by the branch predication manager circuit, an instruction fetch unit of the hardware processor to fetch instructions of both a taken portion and a not-taken portion of the conditional critical branch up to the point of re-convergence.

20. The non-transitory machine readable medium of claim 19, further comprising causing, by the branch predication manager circuit, the taken portion of the conditional critical branch to be architecturally visible after detecting the branch instruction of the conditional critical branch is executed by the execution unit.

21. The non-transitory machine readable medium of claim 19, further comprising:
incrementing a counter for every mispredicted instance of the branch instruction that triggers a pipeline flush; and
disabling use of the predicted future outcome for the conditional critical branch comprising the branch instruction when the counter exceeds a threshold.

22. The non-transitory machine readable medium of claim 19, further comprising:
determining, by the branch predication manager circuit, if the conditional critical branch is one of a plurality of possible convergence patterns, and
causing the instruction fetch unit to fetch the instructions of both the taken portion and the not-taken portion of the conditional critical branch up to the point of re-convergence in response to the conditional critical branch being one of the plurality of possible convergence patterns.

23. The non-transitory machine readable medium of claim 17, further comprising determining, by the branch predication manager circuit, that a conditional branch is the critical conditional branch when the conditional branch exceeds a minimum threshold of misprediction events in an observation window of retired instructions.

24. The non-transitory machine readable medium of claim 17, further comprising throttling disabling of the use of the predicted future outcome, by the branch predication manager circuit, based at least in part on a comparison of performance for a first proper subset of a plurality of retired instances of the conditional critical branch where the branch predication manager circuit is allowed to disable use of the predicted future outcome and performance for a second proper subset of the plurality of retired instances of the conditional critical branch where the branch predication manager circuit is not allowed to disable use of the predicted future outcome.

* * * * *